(12) United States Patent
Jones

(10) Patent No.: US 9,866,886 B2
(45) Date of Patent: Jan. 9, 2018

(54) METHOD AND APPARATUS FOR DISTRIBUTING A MEDIA CONTENT SERVICE

(71) Applicant: Telefonaktiebolaget L M Ericsson (publ), Stockholm (SE)

(72) Inventor: Anthony Richard Jones, Southampton (GB)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/436,410

(22) PCT Filed: Oct. 23, 2012

(86) PCT No.: PCT/EP2012/070960
§ 371 (c)(1),
(2) Date: Apr. 16, 2015

(87) PCT Pub. No.: WO2014/063726
PCT Pub. Date: May 1, 2014

(65) Prior Publication Data
US 2015/0256906 A1    Sep. 10, 2015

(51) Int. Cl.
*H04N 7/173* (2011.01)
*H04N 21/262* (2011.01)
(Continued)

(52) U.S. Cl.
CPC ... *H04N 21/26216* (2013.01); *H04L 65/1083* (2013.01); *H04L 65/4076* (2013.01);
(Continued)

(58) Field of Classification Search
CPC ......... H04N 21/2181; H04N 21/23439; H04N 21/23805; H04N 21/44209;
(Continued)

(56) References Cited

U.S. PATENT DOCUMENTS 7,835,437 B1 * 11/2010 Zhang ............. H04N 21/23608
375/240.03
7,944,863 B2 * 5/2011 Smith ................ H04N 7/17318
348/E7.071
(Continued)

FOREIGN PATENT DOCUMENTS

| CN | 1691591 | 11/2005 |
|---|---|---|
| CN | 101860538 | 10/2010 |
| WO | WO 2011/134501 | 11/2011 |

OTHER PUBLICATIONS

"Internet Group Management Protocol, Version 3", Oct. 2002, pp. 1-53.*
(Continued)

*Primary Examiner* — An Son P Huynh
(74) *Attorney, Agent, or Firm* — Baker Botts, LLP

(57) ABSTRACT

A media content service is distributed across a distribution network. A plurality of media content service representations (80A, 80B) for the media content service are generated. Each of the media content representations (80A, 80B) has a different bit rate. Each of the media content service representations (80A, 80B) is divided into segments (81A, 81B). Segments (81A, 81B) of the plurality of media content service representations are aligned in time. The segments are transmitted as a sequence of bursts (82A, 82B). The bursts of the plurality of media content service representations are aligned in time. There is a window period (83) between successive bursts during which media content is not transmitted. Each of the media content service representations is transmitted as a multicast. Each of the generated media content service representations (80A, 80B) has a respective bit rate and each of the segments (81A, 81B) is transmitted at a higher bit rate to create the window periods (83) between successive bursts (82A, 82B).

24 Claims, 18 Drawing Sheets

(51) Int. Cl.
| | |
|---|---|
| H04L 29/06 | (2006.01) |
| H04N 21/2343 | (2011.01) |
| H04N 21/238 | (2011.01) |
| H04N 21/442 | (2011.01) |
| H04N 21/462 | (2011.01) |
| H04N 21/6332 | (2011.01) |
| H04N 21/6405 | (2011.01) |
| H04N 21/643 | (2011.01) |
| H04N 21/845 | (2011.01) |
| H04N 21/218 | (2011.01) |
| H04N 21/61 | (2011.01) |
| H04N 21/647 | (2011.01) |

(52) U.S. Cl.
CPC ......... *H04L 65/80* (2013.01); *H04N 21/2181* (2013.01); *H04N 21/23439* (2013.01); *H04N 21/23805* (2013.01); *H04N 21/44209* (2013.01); *H04N 21/4621* (2013.01); *H04N 21/6125* (2013.01); *H04N 21/6332* (2013.01); *H04N 21/6405* (2013.01); *H04N 21/64322* (2013.01); *H04N 21/64792* (2013.01); *H04N 21/8456* (2013.01)

(58) Field of Classification Search
CPC ........... H04N 21/4621; H04N 21/6125; H04N 21/6332; H04N 21/6405; H04N 21/64322; H04N 21/64792; H04N 21/8456
See application file for complete search history.

(56) References Cited

U.S. PATENT DOCUMENTS

| | | | | |
|---|---|---|---|---|
| 8,014,393 | B1* | 9/2011 | Faheem | H04L 47/15 370/390 |
| 8,155,098 | B2* | 4/2012 | Huang | H04L 12/189 370/332 |
| 8,532,171 | B1* | 9/2013 | Narayanan | H04N 21/8451 375/240.01 |
| 8,918,533 | B2* | 12/2014 | Chen | H04N 21/23439 709/231 |
| 9,432,433 | B2* | 8/2016 | Luby | H04N 21/23106 |
| 2004/0117503 | A1* | 6/2004 | Nguyen | H04L 12/185 709/238 |
| 2005/0013274 | A1* | 1/2005 | Pekonen | H03M 13/09 370/329 |
| 2005/0090235 | A1* | 4/2005 | Vermola | H04H 20/57 455/414.3 |
| 2006/0029078 | A1* | 2/2006 | Lu | H04L 12/185 370/395.2 |
| 2006/0095944 | A1* | 5/2006 | Demircin | H04N 19/172 725/81 |
| 2006/0127032 | A1* | 6/2006 | van Rooyen | H04H 20/24 386/235 |
| 2006/0285508 | A1* | 12/2006 | Vermola | H04H 20/28 370/312 |
| 2007/0019579 | A1* | 1/2007 | Xu | H04H 20/42 370/312 |
| 2007/0039028 | A1* | 2/2007 | Bar | H04N 21/23439 725/95 |
| 2007/0072579 | A1* | 3/2007 | Paila | H04H 20/42 455/343.2 |
| 2007/0076714 | A1 | 4/2007 | Ananthakrishnan et al. | |
| 2007/0121629 | A1* | 5/2007 | Cuijpers | H04L 12/1859 370/390 |
| 2007/0130359 | A1 | 6/2007 | Amini et al. | |
| 2007/0195727 | A1* | 8/2007 | Kinder | H04L 12/24 370/328 |
| 2007/0287451 | A1* | 12/2007 | Seo | H04H 20/26 455/434 |
| 2008/0034391 | A1* | 2/2008 | Lehman | H04H 20/63 725/59 |
| 2008/0036909 | A1* | 2/2008 | Paila | H04H 20/426 348/461 |
| 2008/0080471 | A1* | 4/2008 | Rinne | H04L 12/18 370/343 |
| 2008/0109557 | A1* | 5/2008 | Joshi | H04L 47/10 709/231 |
| 2008/0141317 | A1* | 6/2008 | Radloff | H04N 5/44582 725/87 |
| 2008/0216116 | A1* | 9/2008 | Pekonen | H04N 21/23614 725/39 |
| 2008/0298337 | A1* | 12/2008 | Rezaei | H04H 20/30 370/345 |
| 2008/0304520 | A1* | 12/2008 | Hannuksela | H04L 1/0057 370/498 |
| 2009/0025052 | A1* | 1/2009 | Schlack | H04N 21/23805 725/116 |
| 2009/0063681 | A1* | 3/2009 | Ramakrishnan | H04N 7/17318 709/225 |
| 2009/0222875 | A1* | 9/2009 | Cheng | H04H 20/63 725/147 |
| 2009/0282162 | A1* | 11/2009 | Mehrotra | H04L 65/607 709/233 |
| 2009/0307732 | A1* | 12/2009 | Cohen | G06Q 30/02 725/87 |
| 2009/0327842 | A1* | 12/2009 | Liu | H04L 1/0057 714/776 |
| 2010/0031162 | A1* | 2/2010 | Wiser | G06Q 30/0255 715/747 |
| 2010/0036963 | A1* | 2/2010 | Gahm | H04N 7/17318 709/231 |
| 2010/0080221 | A1* | 4/2010 | Beatini | H04N 21/64322 370/390 |
| 2010/0115099 | A1* | 5/2010 | Gu | H04L 47/806 709/226 |
| 2010/0189182 | A1* | 7/2010 | Hannuksela | H04N 21/234327 375/240.25 |
| 2010/0254462 | A1* | 10/2010 | Friedrich | H04N 21/26616 375/240.25 |
| 2010/0322302 | A1* | 12/2010 | Rodriguez | H04N 21/631 375/240.01 |
| 2011/0002405 | A1* | 1/2011 | Raveendran | H04H 60/41 375/260 |
| 2011/0030019 | A1* | 2/2011 | Ulm | H04N 7/17318 725/98 |
| 2011/0061084 | A1* | 3/2011 | Bejerano | H04H 20/82 725/109 |
| 2011/0185388 | A1* | 7/2011 | Gratton | H04N 5/76 725/53 |
| 2011/0255535 | A1* | 10/2011 | Tinsman | H04L 47/10 370/390 |
| 2012/0144445 | A1* | 6/2012 | Bonta | H04L 12/1868 725/116 |
| 2012/0198506 | A1* | 8/2012 | Joe | H04N 21/44209 725/97 |
| 2013/0064283 | A1* | 3/2013 | Sun | H04N 21/2343 375/240.01 |
| 2013/0067052 | A1* | 3/2013 | Reynolds | H04L 67/02 709/223 |
| 2013/0111058 | A1* | 5/2013 | Smith | H04N 21/44016 709/231 |
| 2013/0132986 | A1* | 5/2013 | Mack | H04L 65/605 725/14 |
| 2013/0159388 | A1* | 6/2013 | Forsman | H04N 21/64322 709/203 |
| 2013/0219423 | A1* | 8/2013 | Prickett | H04N 21/23439 725/32 |
| 2014/0019587 | A1* | 1/2014 | Giladi | H04L 29/06476 709/217 |
| 2014/0050082 | A1* | 2/2014 | Sun | H04L 47/38 370/230 |

(56) References Cited

U.S. PATENT DOCUMENTS

2014/0341204 A1* 11/2014 Hannuksela, Sr. ... H04L 1/0057
370/345
2015/0289003 A1* 10/2015 Huber ................. H04L 65/4076
725/116

OTHER PUBLICATIONS

International Search Report for International application No. PCT/EP2012/070960, dated May 23, 2013.
State Intellectual Property Office of People's Republic of China Search Report (English Translation only), Application No. 201280076601.X, filing date: Dec. 23, 2016, 2 pages.

* cited by examiner

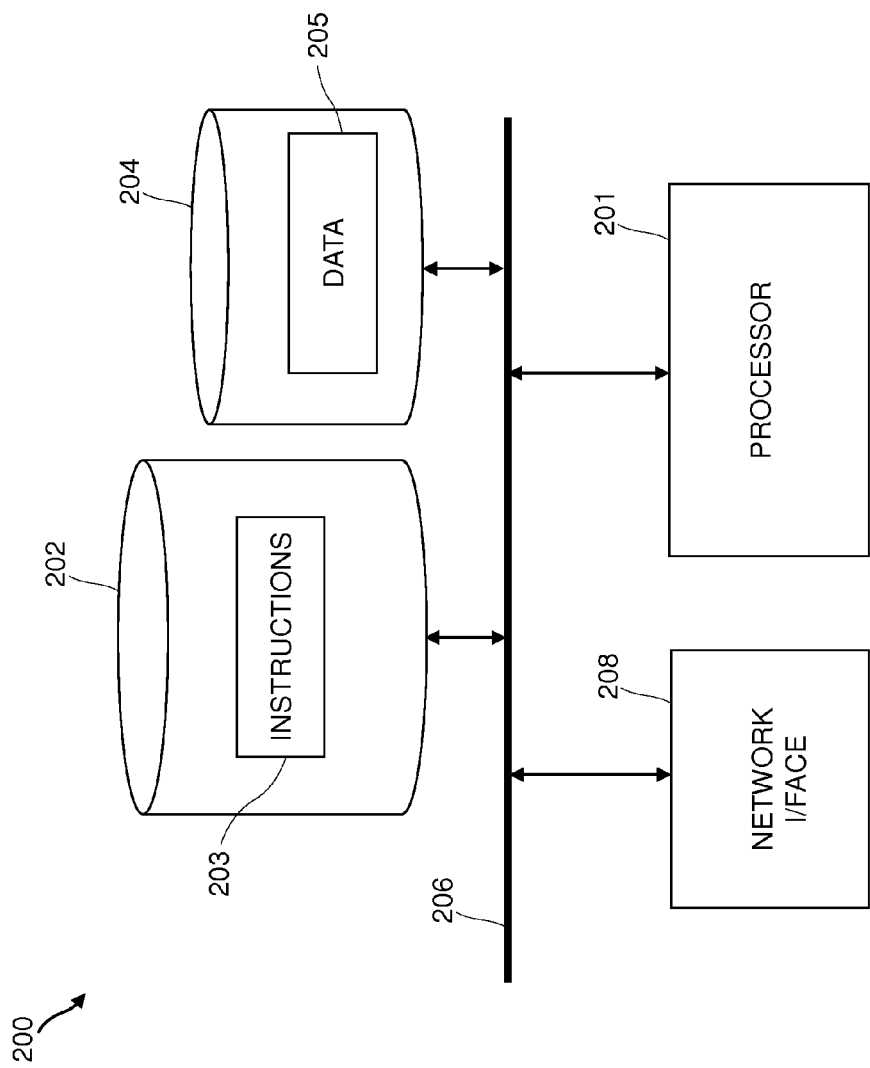

METHOD AND APPARATUS FOR DISTRIBUTING A MEDIA CONTENT SERVICE

PRIORITY

This nonprovisional application is a U.S. National Stage Filing under 35 U.S.C. §371 of International Patent Application Serial No. PCT/EP2012/070960, filed Oct. 23, 2012, and entitled "A Method And Apparatus For Distributing A Media Content Service."

TECHNICAL FIELD

This invention relates to a method and apparatus for distributing a media content service and to a method and apparatus for receiving a media content service.

BACKGROUND

Traditional telecommunications systems have evolved rapidly in recent years to encompass considerably more capability than simply delivering a telephony service. Internet technology based on data packets and associated transmission protocols, for example the Internet Protocol (IP), has now superseded the old space switching techniques and dedicated transmission resources during a telephone call or data transmission session.

The convergence of flexible delivery technologies has enabled services to be mixed in the same physical resource so that for example, in telephony networks, subscribers are now able to receive audio-visual content, including relayed broadcast television and radio services, as well as access internet resources, all via their telephone lines. Similarly, the expansion of wireless networks have enabled a user to receive a range of communications services over a wireless delivery channel.

A Digital Subscriber Loop (xDSL) modem/router, which is widespread in homes, acts as a common assembly point for all domestic communications traffic, such as telephony, computer-based web browsing, email, home shopping or streaming of video material. As will be appreciated by a skilled person, the capacity of the digital subscriber loop has to be shared among the services being provided to the subscriber at any particular time.

There is considerable interest in receiving "streamed" services which deliver a stream of video and/or audio material to users. The content can be live content or it can be recorded content which is requested on demand. In an Internet Protocol Television (IPTV) system, video and audio content is delivered to users via Internet Protocol (IP) delivery mechanisms. These types of services require a continuous and uninterrupted flow of data. A premises may have multiple terminals which are capable of receiving media content. The demands placed on the delivery channel can vary according to how many terminals require content at a particular time.

Streamed media content services can be provided by one of two methods: Unicast or Multicast. Unicast provides the subscribing receiver with a direct and unique two-way path through the delivery network all the way back to the media server supplying the required data stream. The main streaming activity is managed on a one-to-one basis between the receiver and the source server. The network between the source server and receiver typically comprises a series of intermediate servers installed at network nodes which are not directly involved in the service but only support the transfer of a packet stream. Typically the protocols used to support the transmissions are simple forms of Internet Protocol (IP) itself augmented by one or more higher layer protocols to provide flow control. These protocols extend across the span of the link between the source server and a given receiver. This method of distribution is wasteful of network capacity because, at busy times and for popular media streams, many copies exist in the network simultaneously and this contributes to network congestion.

A Unicast system can support Adaptive Bit Rate Streaming (ABR). This allows some form of rate adaptation. A given service is encoded at a selection of different bit rates (known as representations), with synchronised boundary points at defined locations (e.g. every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system requires the unicast two-way path between source and receiver to request files and deliver the requested files.

Multicast makes more efficient use of bandwidth by sharing content streams among several receivers. Intermediate network routers are now more closely involved in the service delivery such that some control and management functions are delegated from the source server. This control is supported by more extensive protocols devised for this type of application such as Protocol Independent Multicast (PIM) and Internet Group Multicast Protocol (IGMP). When a new receiver requests a given media item, the network router system finds an existing stream of that content already in the network and directs a copy of it to that new receiver from an appropriately near network node. A new receiver has to be able to join this existing stream under controlled conditions that do not adversely affect existing receivers. Any receiver in this group also has to be able leave the stream, or pause its consumption, without affecting the others. There is now a clear separation of control and management from the content. This complicates the control function because several receivers will have different instantaneous bit rate and control needs and so the segmentation of the stream as it passes through a given network has to deal with the conflicting demands. These are managed directly between the receiving device itself and the nearest upstream router/server that will mediate control functions including any need to refer back to earlier network servers or even the original source server.

Currently, each TV service has to be set up with a conservative configuration. This can be a capped Variable Bit Rate (VBR) with a safe cap value. This is because it is not possible to change bit rate of a service on the fly without interrupting the TV service.

In summary, while unicast systems can support an adaptive bit rate of a streamed service over time, this comes at a significant cost in terms of resources of the delivery network to support a large number of unicast paths, and may require additional servers located near to clients of the network to maintain acceptable response times. Multicast systems can more efficiently use bandwidth resources of the network, but do not support adaptive bit rate needs of client devices.

The present invention seeks to provide an alternative way of distributing media content services, such as video services.

SUMMARY

An aspect of the present invention provides a method of distributing a media content service across a distribution network comprising receiving or generating a plurality of media content service representations for the media content service. Each of the media content representations have a different bit rate. The method further comprises dividing each of the media content service representations into segments. The segments of the plurality of media content service representations are aligned in time. The method further comprises transmitting the segments of each of the plurality of media content service representations as a sequence of bursts. The bursts of the plurality of media content service representations are aligned in time. There is a window period between successive bursts during which media content is not transmitted. Each of the media content service representations is transmitted as a multicast. Each of the received or generated media content service representations has a respective bit rate. The transmitting comprises transmitting each of the segments at a higher bit rate to create the window periods between successive bursts.

Advantageously, the dividing comprises inserting data which indicates a boundary of a segment and the step of transmitting each of the segments uses the inserted data to determine a boundary of a segment.

Advantageously, the method further comprises transmitting an information element which indicates at least one of: an end of a burst; an advance notice of an end of a burst. The information element can be carried within each of the bursts.

Advantageously, each of the media content service representations is transmitted as a first multicast with a multicast destination IP address, and the method comprises transmitting a second multicast which carries the information element, wherein the second multicast has the same destination IP address as the first multicast.

Advantageously, the method further comprises adapting the media content data into packets for transport over the distribution network, and the step of transmitting each of the segments as a burst operates on the packets.

Advantageously, the method further comprises transmitting information about which media content service representations are available for selection.

The method can be performed by a node of the distribution network such as a head end node, or by any other node or combination of nodes.

Another aspect of the invention provides a method of receiving a media content service across a delivery channel. The media content service is available in a plurality of representations each having a different bit rate. Each of the plurality of media content representations are transmitted as a sequence of bursts, with the bursts aligned in time. There is a window period between successive bursts during which media content is not transmitted. The method comprises receiving a first of the media content service representations of the media content service across the delivery channel as part of a multicast of the first media content service representation. The method further comprises selecting a second of the media content service representations of the media content service for delivery across the delivery channel. The method further comprises sending a request to leave the multicast of the first media content service representation. The method further comprises sending a request to join a multicast of the second media content service representation. The method further comprises receiving the second media content service representation as part of the multicast of the selected media content service representation. The leaving and joining of the respective multicasts occurs during one of the window periods.

Advantageously, the method further comprises receiving an information element which indicates at least one of: an end of a burst; an advance notice of an end of a burst and using the information element to determine when the sending a request to leave the multicast of the first media content service representation and the sending a request to join a multicast of the second media content service representation can occur.

Advantageously, the method further comprises receiving information about which media content service representations are available for selection.

Advantageously, the step of sending a request to join a multicast occurs before the step of sending a request to leave a multicast.

Advantageously, the method is for receiving a composite media content services stream, comprising one or more media content services, the method further comprising dynamically determining the required media content services for delivery across the delivery channel. The method further comprises dynamically determining the bandwidth available for delivery of the composite media content services stream. The method further comprises selecting one of the plurality of media content service representations of a required media content service for delivery across the delivery channel depending on at least the bandwidth available for the composite media content services stream.

Advantageously, the selecting depends on at least one of: a type of device associated with the media content service and a priority of the media content service.

Advantageously, a higher priority information element is allocated to real-time media content services and a lower priority information element is allocated to recorded media content services.

Advantageously, a value of a priority information element associated with the media content service depends on at least one of: a categorisation of the media content service; a device which is to consume the media content service.

Advantageously, the method further comprises storing data received in bursts of the received media content service and sending information about the availability of the stored data to adaptive bit rate devices served by the apparatus.

Advantageously, the method is performed at a subscriber apparatus.

Advantageously, each burst comprises a plurality of Internet Protocol packets.

Advantageously, the media content service is a video service.

Advantageously, at least two of the plurality of media content service representations for the video service have a different video resolution.

Another aspect of the invention provides apparatus for distributing a media content service across a distribution network. The apparatus comprises an interface for receiving a media content service. The apparatus comprises segmenting apparatus arranged to generate a plurality of segmented media content service representations for the media content service, each of the media content representations having a different bit rate and divided into segments, wherein the segments of the plurality of media content service representations are aligned in time. The apparatus comprises an output unit arranged to transmit the segments of each of the plurality of media content service representations as a sequence of bursts, wherein the bursts of the plurality of media content service representations are aligned in time, and wherein there is a window period between successive bursts during which media content is not transmitted. The output unit is arranged to transmit each of the media content service representations as a multicast. Each of the received or generated media content service representations has a respective bit rate and the output unit is arranged to transmit each of the segments at a higher bit rate to create the window periods between successive bursts.

Another aspect of the invention provides apparatus for receiving a media content service across a delivery channel. The media content service is available in a plurality of representations each having a different bit rate. Each of the plurality of media content representations are transmitted as a sequence of bursts, with the bursts aligned in time, and wherein there is a window period between successive bursts during which media content is not transmitted. The apparatus comprises a communication interface for receiving a first of the media content service representations of the media content service across the delivery channel as part of a multicast of the first media content service representation. The apparatus comprises a controller coupled to the communication interface which is arranged to select a second of the media content service representations of the media content service for delivery across the delivery channel. The controller is further arranged to send a request to leave the multicast of the first media content service representation. The controller is further arranged to send a request to join a multicast of the second media content service representation. The controller is further arranged to receive the second media content service representation as part of the multicast of the selected media content service representation, wherein the leaving and joining of the respective multicasts occurs during one of the window periods.

Embodiments of the present invention provide a way of delivering media content services (e.g. video services) in a manner which makes efficient use of resources of the distribution network, while allowing a client device to dynamically alter the bit rate of the media content service. The client device may need to adapt the bit rate due to varying bandwidth demands required of the delivery channel, such as a change to the number of media content services used at any particular time, or a change to the bandwidth of the delivery channel (e.g. with a wireless delivery channel).

Embodiments of the present invention provide a way of allowing a client device to dynamically alter the bit rate of the media content service without significant disruption to the media content service.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 18 shows processing apparatus for a computer-based implementation.

DETAILED DESCRIPTION

Figure 1:
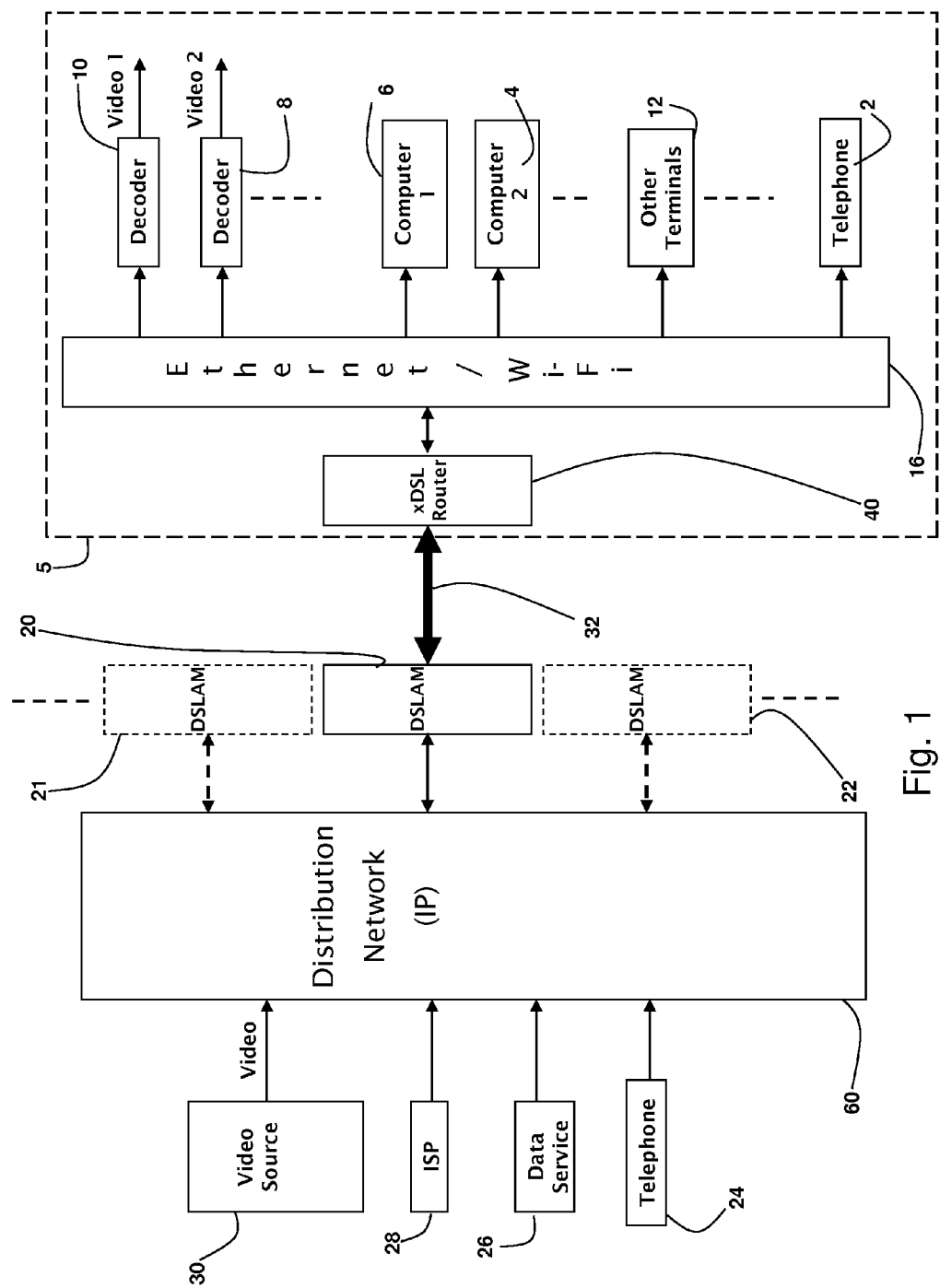
FIG. 1 shows a typical system for delivering services to subscriber premises over a delivery channel.

FIG. 1 is a schematic diagram of a typical system for providing communication services to subscriber premises 5. The various resources shown contribute to the delivery of a group of services to a subscriber over the digital subscriber loop 32 between a premises 5 and the network.

At the subscriber side shown on the right-hand side of FIG. 1, a number of different devices are present that may require services to be provided over a digital subscriber loop. Typically, such devices may include: a telephone 2; computers 4, 6; video decoders 8 and 10; together with other terminals denoted generically by terminal 12. These devices 2-12 are coupled to a digital subscriber loop (xDSL) router 40 over a local subscriber network 16, which is typically provided by an Ethernet or a wireless network.

On the network side shown on the left-hand side of FIG. 1, a digital subscriber loop (xDSL) access multiplexer (DSLAM) 20 is coupled via a distribution network 60 to a plurality of service sources 24-30. The distribution network 60 can be an Internet Protocol (IP) based distribution network in which all of the services 24-30 are transported using IP. The term xDSL includes Asymmetric Digital Subscriber Line (ADSL) and variants (ADSL2, ADSL2+), Very high bit-rate Digital Subscriber Line (VDSL) and other variants.

The services 24-30 shown at the left are examples of various types of service, all of which may be combined using Internet Protocol (IP) for delivery across the digital subscriber loop to the consumer, where they are separated again for the individual destination devices in the home, as will be understood by a skilled person. The Internet Protocol (IP) infrastructure at the Service Provider end is configured differently on demand for each subscriber, as will be understood by a skilled person, and additional DSLAMs 21, 22 are shown for completeness.

A video source 30 is shown supplying an input to the distribution network 60. There are various types of video service. A first type of video service is live video that is delivered in real time. A second type of video service uses video data which is stored as video files in servers. These video files may be watched in real time as if they were live video or may be transferred in non-real time for later playback at the subscriber's premises. Typically, this video service type might be used for a film library that enables a film to be downloaded by a subscriber for immediate viewing or stored for later use. The stored video files may be for video service recording content accessed in accordance with the requirements of an individual subscriber, for example in accordance with a digital video recorder (DVR) schedule of a subscriber. In some embodiments this non real-time video service content may be deferred by being temporarily buffered in the network when the digital subscriber loop is being heavily utilised, and being moved to the local storage when capacity across the digital subscriber loop becomes available.

Figure 2:
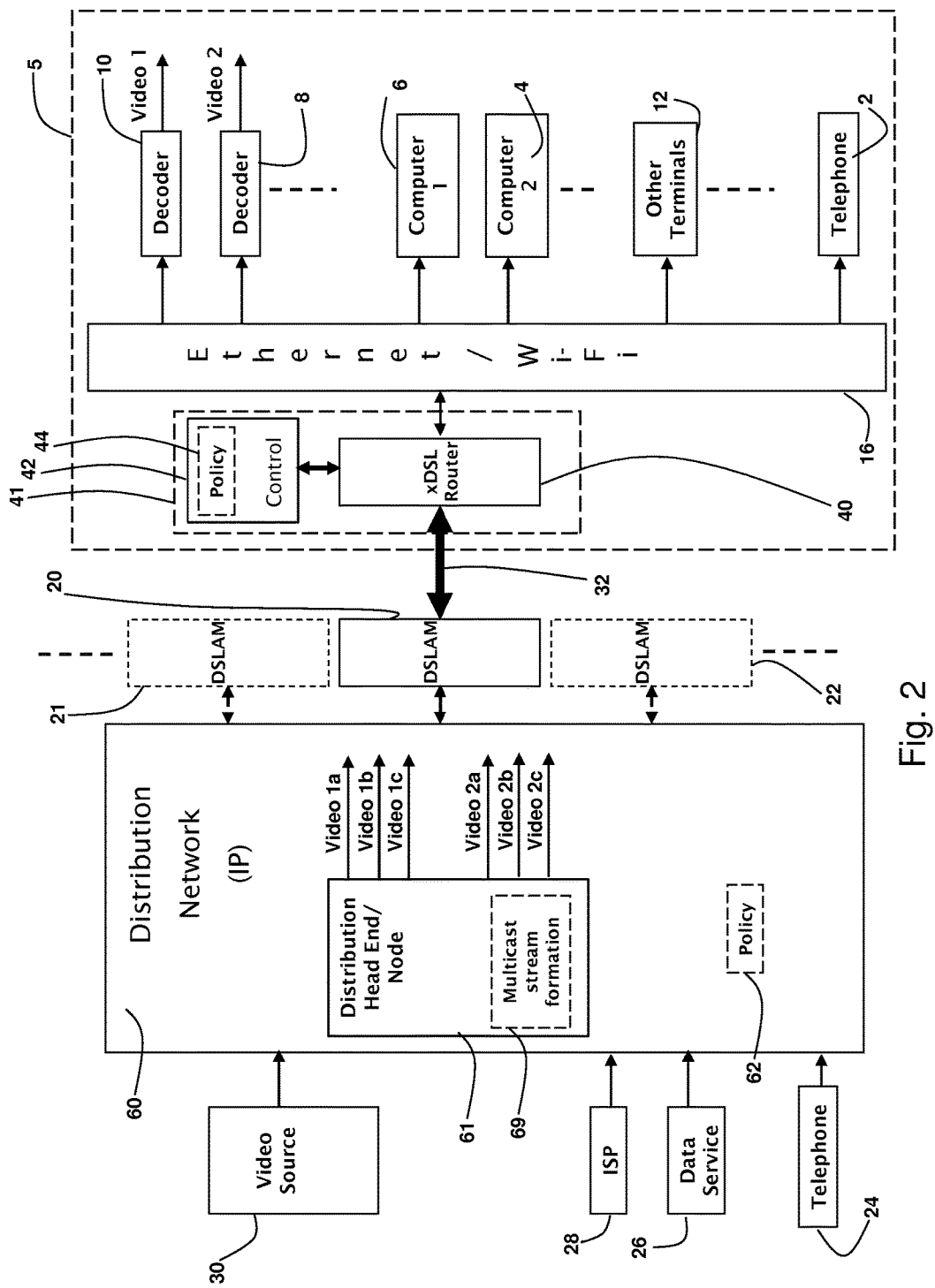
FIG. 2 shows a modified system corresponding with FIG. 1 in accordance with an embodiment of the invention.

FIG. 2 is a schematic diagram corresponding with FIG. 1 and showing additional elements in accordance with embodiments of the invention. Elements in FIG. 2 having the same or similar function to corresponding elements in FIG. 1 have been given the same reference numerals.

In FIG. 2, apparatus 41 provided at a subscriber end 5 includes a control function which is able to select a representation of a media content stream, at a particular bit rate, and can join a multicast which provides that representation. The control function is able to dynamically select between representations over a period of time, and can leave a multicast of one representation and can join a multicast of another representation. In some embodiments, apparatus 42 provided at a subscriber end 5 can arbitrate between multiple demands of devices 2-12. Apparatus 42 can conveniently form part of xDSL router 40 or it can be a separate device which is connected to the xDSL router 40. Alternatively, the functionality of apparatus 42 can form part of a device 2-12 connected to the xDSL router 40. Policy, which can be used by the apparatus 42 to arbitrate between demands, can be located 44 at the subscriber apparatus and/or in the network 62. Distribution network 60 includes additional processing functions 69 to form multicast streams which provide a set of representations of a service at different bit rates. As described below, these representations are transmitted as a sequence of bursts with window periods between successive bursts which allow a subscriber apparatus to join and/or leave a multicast of a required representation. The processing functions 69 can be performed by a distribution head end 61 or by any other node or combination of nodes.

In embodiments of the invention, each media content service is made available in a plurality of media content service representations, each having a different bit rate. For example, a video service 1 can be made available in three video service representations 1a, 1b, 1c and video service 2 can be made available in three video service representations 2a, 2b, 2c. In different embodiments, and for different video services, the number of video services representations available for selection may be greater or less than 3, as decided by a skilled person. One or more other properties of the video service can vary among the representations, such as video resolution, frame rate. Audio rates (or number of audio channels) can also vary between representations. For example, consider representations 1a, 1b, 1c have progressively higher bit rates. At least one of the higher bit rate representations (e.g. 1c) can have a higher resolution than one of the lower bit rate representations (e.g. 1a, 1b).

Figure 3:
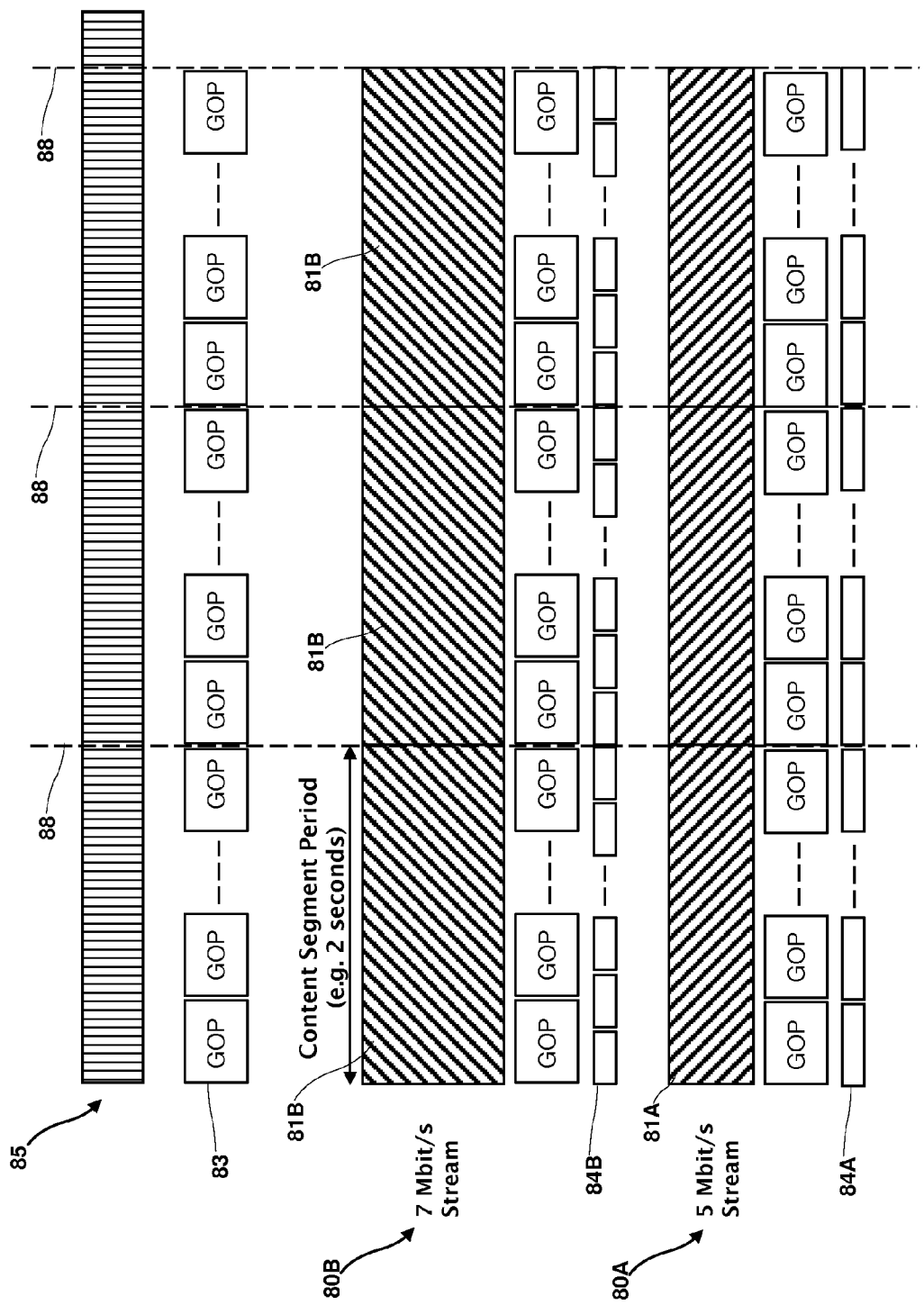
FIG. 3 shows processing performed on a media content stream to create a set of segmented representations in accordance with an embodiment of the invention.

FIG. 3 shows processing performed on a media content stream 85 to form a set of representations 80A, 80B at different bit rates. In this example embodiment the media content is video. Each video service 85 is coded as a set of representations 80A, 80B. For simplicity, FIG. 3 shows Constant Bit Rate (CBR) rate streams but the coding does not have to be constant bit rate. For example, it could be variable bit rate (VBR) or variable bit rate with a particular peak or mean bit rate value, such as capped Variable Bit Rate (VBR). The values of 5 Mbit/s and 7 Mbit/s are example values, and it will be appreciated that a representation can be generated at any other desired value and that any number of representations may be generated. Each representation is divided into a sequence of segments 81A, 81B. Segment boundaries 82 are aligned, such that the segment boundaries of one representation 80A are aligned in time with the segment boundaries of another representation 80B. A corresponding segment in each of the representations correspond to the same frames of video content. As will be explained, this allows a receiver to switch between representations at one of the segment boundaries 88 and perform a smooth transition between representations. Advantageously, a segment boundary 88 occurs at the end of a Group of Pictures (GOP) 83.

A feature of compressed video data stream syntax is the Group of Pictures (GOP) which comprises a sequence of complete and contiguous video pictures or frames. The Group of Pictures (GOP) begins with a frame selected to be a master frame, denoted as an "I" or Intra Frame for that sequence. This I Frame is coded without reference to any other frame in the sequence and exploits only spatial redundancy within the I frame. Since I frames may be decoded without reference to picture information in any other frame, I frames can be relied upon as a starting point for a decoder.

The other frames or pictures in a Group of Pictures (GOP) can be coded very efficiently by exploiting temporal redundancy in the image sequence. These frames are coded so that information is transmitted describing differences between the current frame and already coded reference frames temporally adjacent to it. Such frames are of two types: one type is a Predicted or P frame type, which is predicted and coded only from one direction of the image sequence, for example from earlier frames in the image sequence. The other type is a Bidirectional frame or B frame type, which are predicted from both forward and backward directions of the sequence, for example by interpolation from earlier and later frames in the video sequence.

As will be appreciated, the success of compression algorithms in achieving low bit rates is because the P and B Frames use smaller amounts of data to encode the picture than an I Frame and are more numerous in a Group of Pictures (GOP). An I Frame uses more data to encode the picture and so these are relatively sparse in a Group of Pictures (GOP). The I frame is very useful when streams are interrupted or suffer occasional errors because it resets the decoder with an independent Frame.

Thus a Group of Pictures (GOP) can be structured as a sequence of I, P and B Frames in an arbitrary pattern e.g. IBBPBBP . . . until the next I Frame is inserted. The length of the Group of Pictures (GOP) will affect coding efficiency because it uses predominantly small coded frame sizes. Such a Group of Pictures (GOP) is known as a Closed Group of Pictures (GOP) because it is self-contained and has defined entry points at the I Frame for decoders such that coded pictures following the I frame do not reference any pictures before the I frame. This is useful for this application because the I Frames allow points in a stream at which a bit rate change can be made without necessarily disrupting the decoder.

Advantageously, the video service representations of a video service have aligned segment boundaries 88 so that their GOP patterns are aligned. Data for the different bit rate representations 80A, 80B is packetised. FIG. 3 shows a sequence of Transport Stream (TS) packets 84A, 84B for each representation. The number of packets per segment varies according to the bit rate of the representation. The higher bit rate stream 80B has more packets than the lower bit rate stream 80A.

Advantageously, segment boundaries are marked by introducing Boundary Points (BP) that mark the location of the segment boundaries in the segmented streams 80A, 80B where it is possible to switch cleanly between the representations and deliver the segments using multicast. These BPs can also act as reference points in the stream for any other purpose. The BP can be inserted in a continuous stream, for example as a short gap, or the segmented media data stream can be momentarily paused so that the absence of data allows time for receivers to adjust themselves to any changing circumstances including new receivers joining the stream or existing ones pausing or leaving it.

Conveniently, media data can be encoded according to Motion Pictures Experts Group MPEG-2 format and encapsulated into MPEG Transport Streams, but it will be appreciated that segments 81A, 81B can also be coded and encapsulated in any other suitable format, such as the MPEG-4 File Format.

Figure 4:
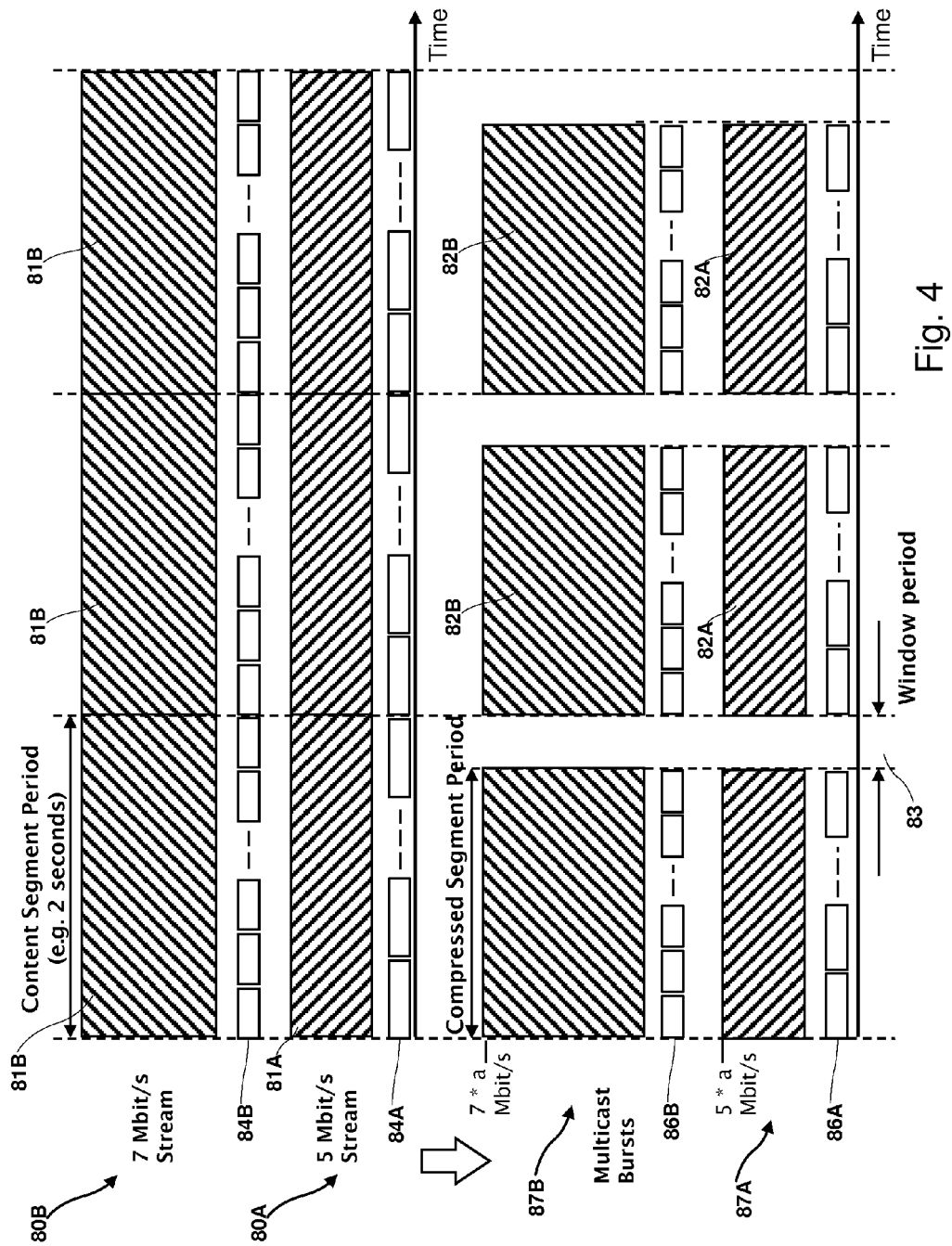
FIG. 4 shows processing performed on representations of a media content stream of different bit rates to form bursts in accordance with an embodiment of the invention.

FIG. 4 shows processing performed on segmented media content streams 80A, 80B, to form a set of bursts at different bit rates. As will be explained below, the segmented streams 80A, 80B are fed into a multicast playout block that makes each segment play out in less time than the interval between the boundary points. The purpose of this is to deliberately introduce a window period between transmitted bursts 82A, 82B. The duration of the window period 83 is sufficient for a multicast receiver to leave one representation of the stream and join a different representation at a different bit rate. The switching between multicasts can be achieved using multicast Leave and Join messages. The duration of the window period 83 is sufficient for a receiver to send requests to join and leave respective multicasts and for switches and routers in the distribution network 60 to action the requests. The multicasts bursts 82A, 82B have a higher bit rate compared to the respective segmented representations 80A, 80B. The bit rate of the bursts is increased by a factor of a, where:

$$a = \frac{\text{segment duration}}{(\text{segment duration} - \text{window duration})}$$

For clarity, FIG. 4 shows the start point of the bursts 82A, 82B aligned in time with the start point of the segments 81A, 81B of representations 80A, 80B, to illustrate the comparison in length of the segments 81A, 81B compared to the bursts 82A, 82B. It will be appreciated that a short buffer period (of at least the length of the window period) is required before the burst can be played out, which would be represented in FIG. 4 as an offset along the time axis between the start of segments 81A, 81B and the start of bursts 82A, 82B.

The start of bursts of different content services can be aligned in time (i.e. all bursts of all services start at the same time) or the start times can be staggered with respect to one another. Aligning the start times of bursts of different services in time can have an advantage of allowing a quicker channel change between services.

One consequence of adding window periods 83 to the transmitted streams is that the flow of content becomes jittered beyond the level that normal packet transmission produces. This can be accommodated by buffering provided within the reception apparatus. The window period duration will influence the amount of jitter produced and so there is an optimum size that is related to the worst case response times of the chain of routers/servers delivering the content. This time is taken for switches to recognise and implement all those steps that are required to keep the stream flowing including the potential need for the multicast content to be found at or near the source server. For segment durations of the order of about 2 seconds, a possible value of the window period is around 330 milliseconds. The window size is a function of the responsiveness of the network to support multicast leave and join functions and it will be appreciated that the window period can be modified to a higher or lower value. More generally, the window period could have a value selected from the range of 0.1 ms and 10 seconds and, more advantageously, the range 10 ms-350 ms. As switches and routers increase in performance, it is possible that the window duration can be reduced to the lower en d of the ranges stated above.

Internet Group Management Protocol (IGMP)v3 provides an explicit LEAVE message, allowing multicast clients to signal they no longer require the multicast to be forwarded to them. This can be implemented in IP switches as "Fast Leave", where the multicast forwarding is stopped immediately when the LEAVE message is received. There is also an IGMP Join message to join a multicast.

Figure 5:
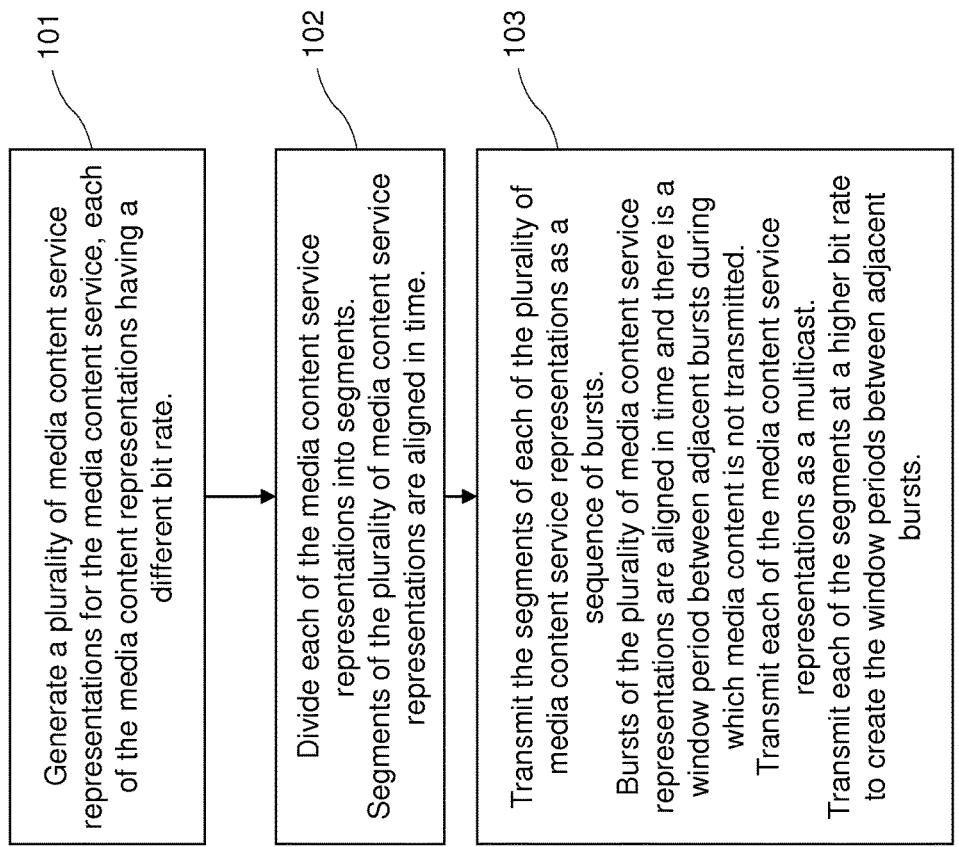
FIG. 5 shows a method of processing media content which can be performed at one or more nodes of a distribution network.

FIG. 5 shows a method according to an embodiment of the invention. The method can be performed by a node in the distribution network 60. Step 101 comprises generating a plurality of media content service representations for the media content service, each of the media content representations having a different bit rate. Step 102 comprises dividing each of the media content service representations into segments. Segments of the plurality of media content service representations are aligned in time. The dividing can comprise marking boundary points between segments by inserting signalling data into the data stream for each representation. Step 103 comprises transmitting the segments of each of the plurality of media content service representations as a sequence of bursts. So, the segments of a first representation are transmitted as a first sequence of bursts, the segments of a second representation are transmitted as a second sequence of bursts, and so on. Bursts of the plurality of media content service representations are aligned in time and there is a window period between adjacent bursts during which media content is not transmitted. So, the bursts of the first representation are time-aligned with the bursts (representing the same part of the content) of the second representation, and with the bursts of any other representations, where the time-aligned bursts represent the same part of the content (e.g. the same video frame). Each of the media content service representations is transmitted as a multicast. Each of the generated media content service representations 80A, 80B has a respective bit rate and the transmitting comprises transmitting each of the segments 81A, 81B at a higher bit rate to create the window periods 83 between successive bursts 82A, 82B.

Figure 6:
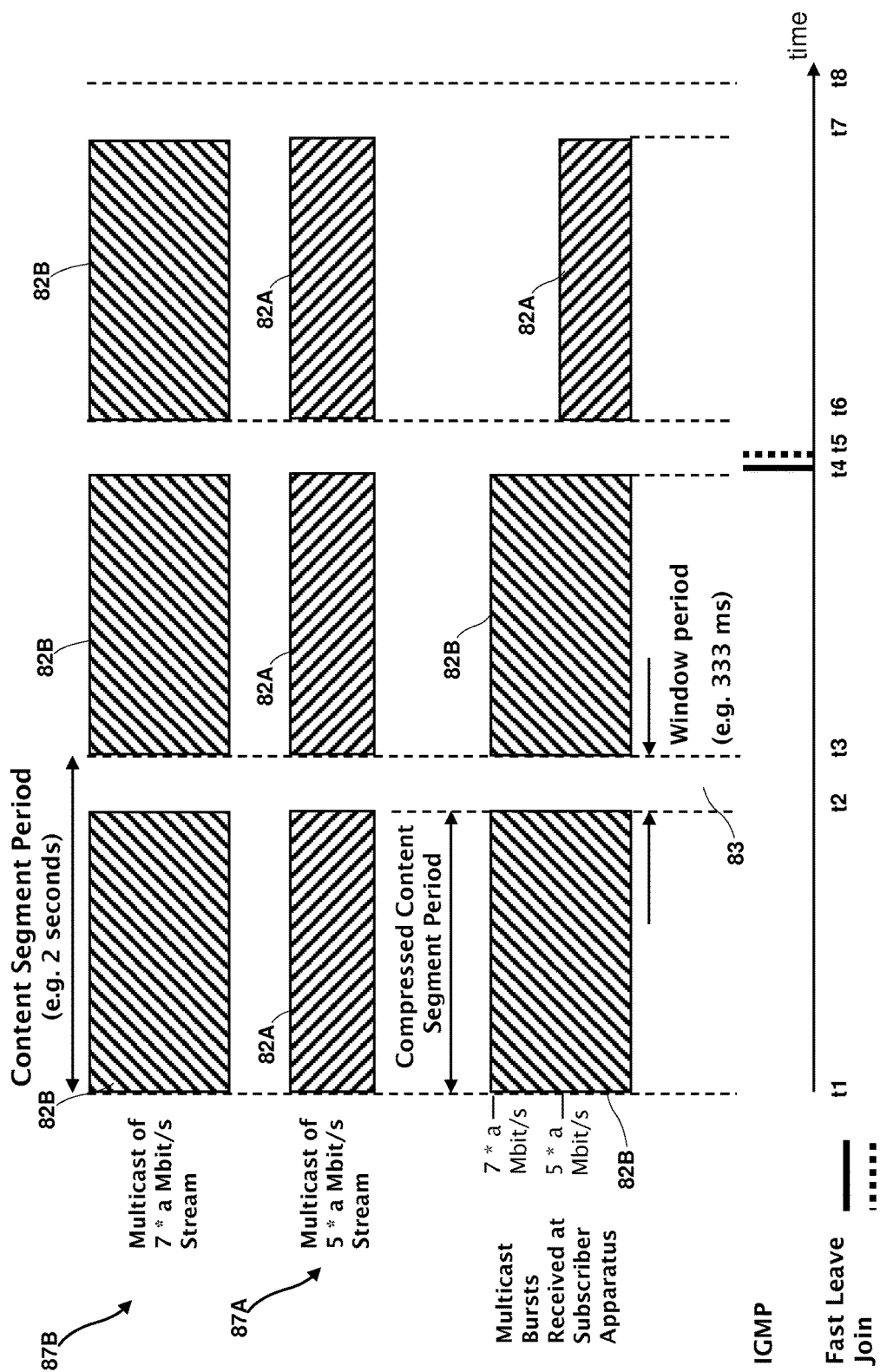
FIGS. 6 and 7 show time lines of an operation to change the bit rate of a media content stream received at a subscriber apparatus.
Figure 7:
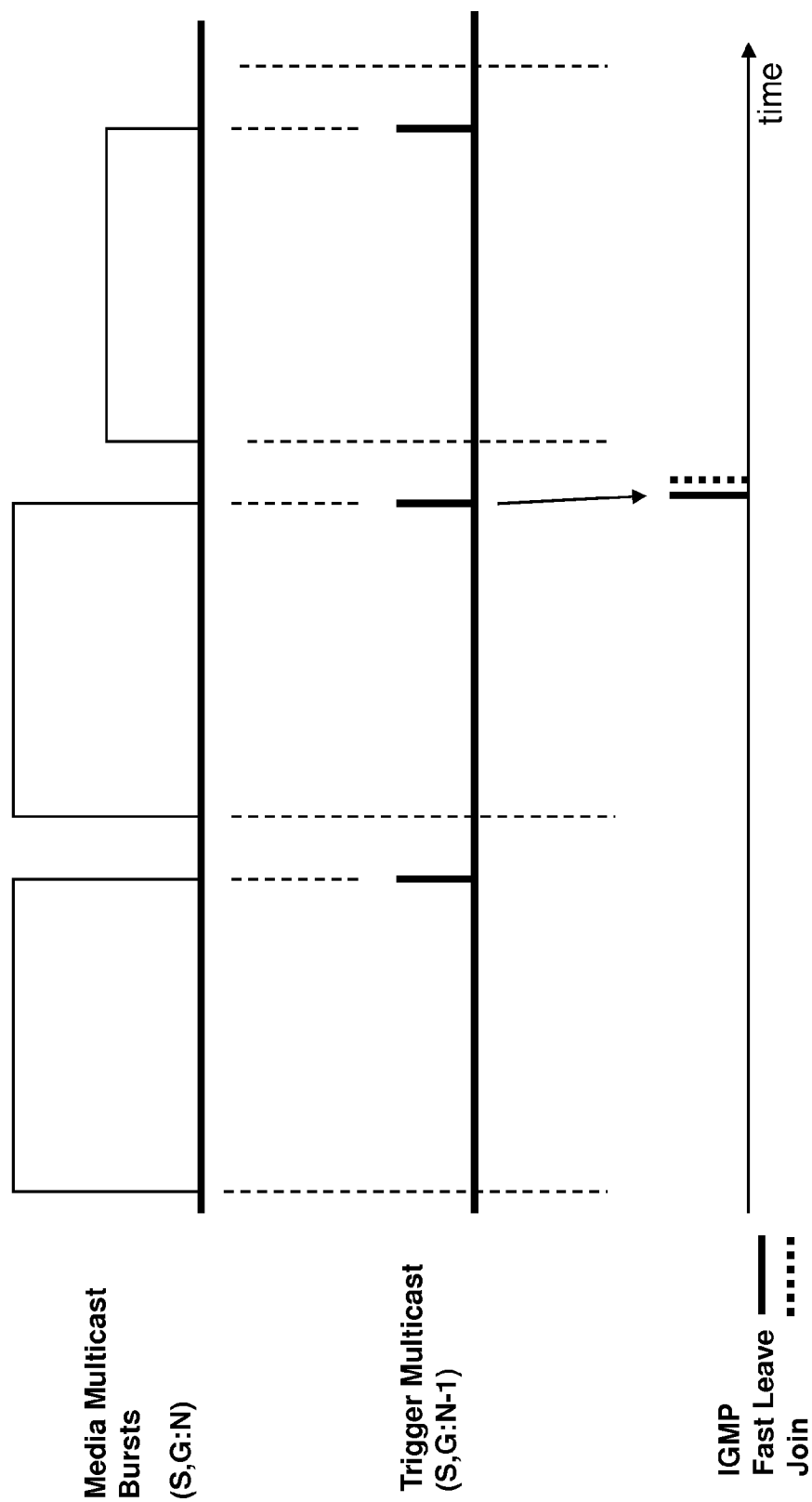

FIGS. 6 and 7 show time lines of an operation to change the bit rate of a media content stream received at a subscriber apparatus. FIG. 6 shows two multicast representations 87A, 87B of different bit rates which are transmitted across distribution network 60. A subscriber apparatus can select one of these representations by joining the multicast. The subscriber apparatus receives bursts 82B of representation 87B (high bit rate) during periods t1-t2 and t3-t4. At time t4 the subscriber apparatus sends signalling to leave the multicast of representation 87B (high bit rate) and to join the multicast of representation 87A (low bit rate). At time t6 the subscriber apparatus receives a burst 82A of representation 87A (low bit rate). The switch between leaving multicast of representation 87B and joining the representation of multicast 87A occurs during the window period t4-t6. Thus, the subscriber apparatus receives a seamless flow of data for the media content service, even though a change in the delivery bit rate has occurred. The order of signalling can be reversed, such that the request to join the new multicast 87A is sent before sending the request to leave the existing multicast 87B. A worst case time for joining a multicast is longer than a worst case time for leaving a multicast, and so it is advantageous to issue the command to join first.

FIG. 7 shows further detail of the process to change the bit rate of a media content stream received at a subscriber apparatus. There are various ways in which a subscriber apparatus can detect the end of a burst and the start of the period when the apparatus can safely switch between representations. It is possible to configure a terminal to measure a "time out" period at the beginning of a window period, but this introduces an undesirable latency. It is more advantageous to send signalling which explicitly indicates an end of a burst, or which gives advance notice of when an end of burst will occur. This signals to the subscriber apparatus when it is possible to safely switch between representations, with minimal delay. Advantageously the locations in the data stream where the switching between streams can safely occur are explicitly signalled within, or alongside, the multicasts, thus allowing a receive device to immediately be aware that a switching opportunity exists. Signalling can be provided, for example, in IP packets that share the same multicast destination address as the IP packets carrying the media content service, but different UDP destination port numbers, allowing simple detection and discrimination at the receive device. This has the advantage that whenever the multicast that carries the media content is routed (in response to IGMP joins) the signalling would also automatically follow. Alternatively, the signalling could be delivered in a separate multicast having a separate multicast destination address, with the subscriber apparatus joining/leaving both the multicast carrying the media content and the multicast carrying the end of burst signalling. Another possibility is to include a trailer indicating an end of burst in the media multicast. Examples include: adding trailer data at the end of the last UDP datagram, sending an empty datagram, or changing a parameter such as the sync byte (normally hexadecimal 47) to a different value. Other possibilities are to send an information element which gives advance notice of an end of a segment, such as a number of TS packets remaining in the current segment, an RTP sequence number of the last IP packet in the current segment, or some other suitable advance notice.

The scheme described above can be used when representations at different bit rates to minimise disruption to the delivery and presentation of media content. When a terminal first joins a service the joining could occur during the window or it may occur at any time.

Figure 8:
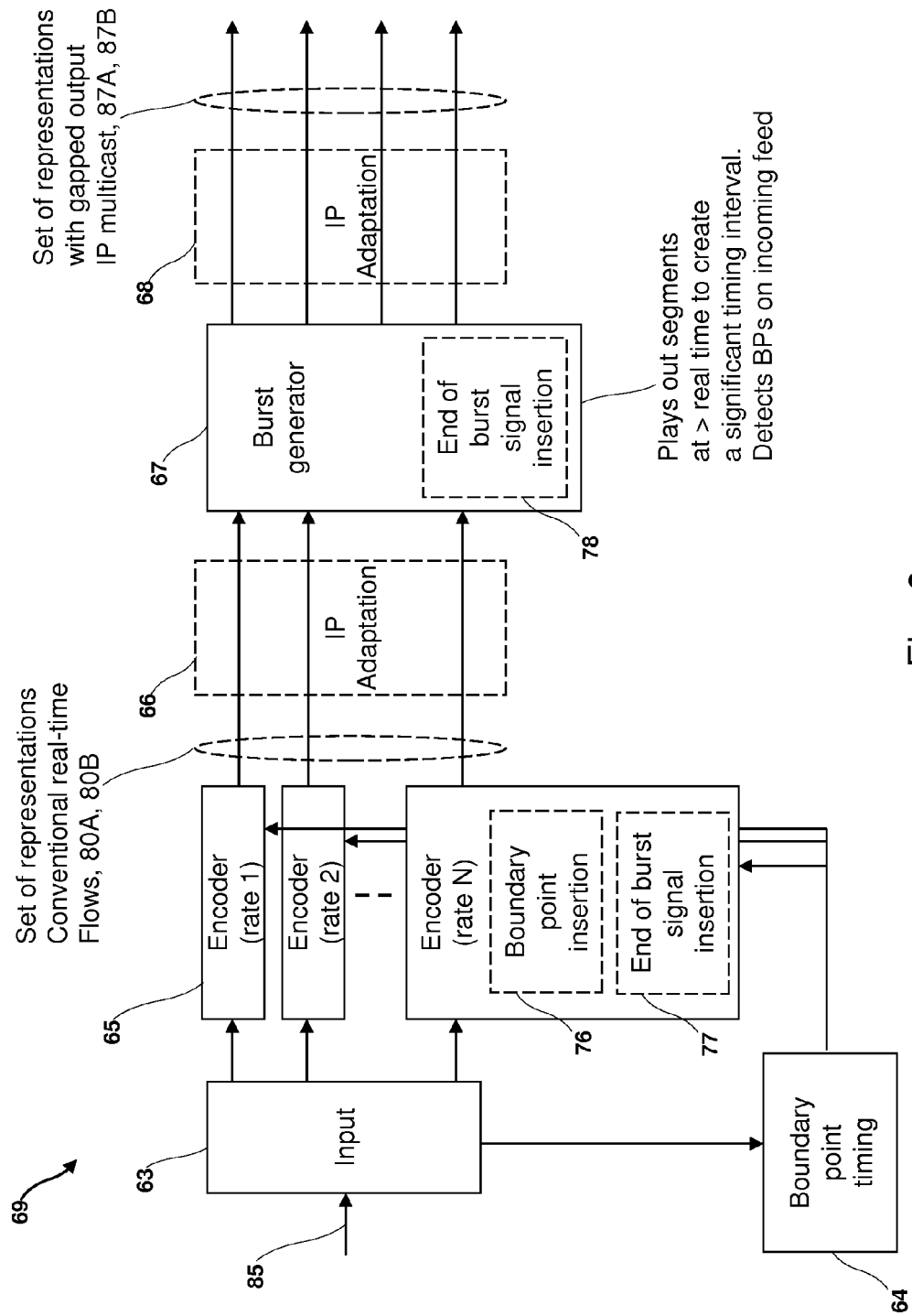
FIG. 8 shows apparatus in accordance with an embodiment of the invention.

FIG. 8 shows apparatus for creating a set of segmented representations and forming bursts in accordance with an embodiment of the invention. The apparatus 69 shown in FIG. 8 can be provided at a distribution head end node 61. The apparatus receives an input feed 85 of content (e.g. video) per service. A set of encoders/transcoders 65 generate, in parallel, a set of representations of the content at a set of different bit rates. The representations can differ in another quantity, such as video resolution. A timing generator 64 outputs a signal that determines the boundary point of the segments. For example, this can output a signal once per 50 frames (2 seconds), or at any other suitable time interval. The signal output by generator 64 is applied to all of the parallel encoders 65 for that service. Advantageously, the set of coders 65 can close the GOP (see FIG. 3) and a unit 76 can insert in-band signalling such as a Random Access Point (RAP) and a Boundary Point (BP). The outputs of the set of coders 65 are the set of representations 80A, 80B which have time-aligned segments. The representations 80A, 80B are applied to a burst generator unit 67 which creates the bursts (82A, 82B, FIG. 4) separated by window periods (83, FIG. 4). Unit 67 plays out data at a higher bit rate than the bit rate at which data was received to create the bursts. Unit 67 recognises the start and end of segments 81A, 81B in the representations 80A, 80B by detecting signalling (e.g. the in-band BP signalling inserted by the encoders 65).

GOPs do not necessarily have to be closed at the boundary point. By default they are closed. However closed GOPs are slightly more inefficient than open GOPs, so it is possible that open GOPs could also be used. The use of open GOPs has a disadvantage that, when changing representations, there may be some visible impairment to the pictures for the first GOP of the new representation. If representation switches occur infrequently, then open GOPs may be acceptable.

Advantageously, multicast address information is added at the IP adaptation stage, which can occur at the head end 61, or at a node downstream of the head end. Multicast IP datagrams have a destination IP address is set to be in a range reserved for multicast.

The apparatus shown in FIG. 8 can operate on data at one of various possible levels. In one advantageous scheme, data is encoded into Transport Stream (TS) packets at a normal rate and the burst generator unit 67 operates on TS packets. Transport Stream packets can be adapted into IP packets 66 before burst generator unit 67, or after unit 67. An alternative is to form bursts before any packetisation (at TS or IP level), but this is less desirable.

FIG. 8 shows several possible places where end of burst signalling can be added. Each encoder 65 can include an end of burst signal insertion unit 77 which adds an information element indicating the end of a burst into the encoded data, which includes a header of the TS packets. Alternatively, the burst generator unit 67 can include an end of burst signal insertion unit 78 which is arranged to insert an information element indicating the end of a burst into each of the bursts. Where end of burst signalling is provided as a multicast (with same or different address), the multicast can be generated at apparatus 61.

Typically, a network operator will receive a media content service feed from a service provider and will then convert the feed to the right characteristics for the distribution network and end users of the network. FIG. 8 shows a set of encoders/transcoders 65 which operate upon an input data stream 85 to form the multiple representations at different bit rates. However, for situations where a set of representations at different bit rates already exist, it is possible for the input 85 to be a set of representations at different bit rates. The multiple representations can be generated at a point of origin into the distribution network 60 or could be supplied by a service provider.

The multiple representations of a video service can include Standard Definition (SD) and High Definition (HD) representations of the same content. The distribution network may receive an SD feed and an HD feed of the content as inputs 85 or just one (SD or HD) feed with transcoding 65 to generate the other of the SD and HD representations. So, input 85 may be a high quality HD feed and encoders 65 transcode the HD feed to generate lower bit rate, lower resolution, versions of the content.

Figure 9:
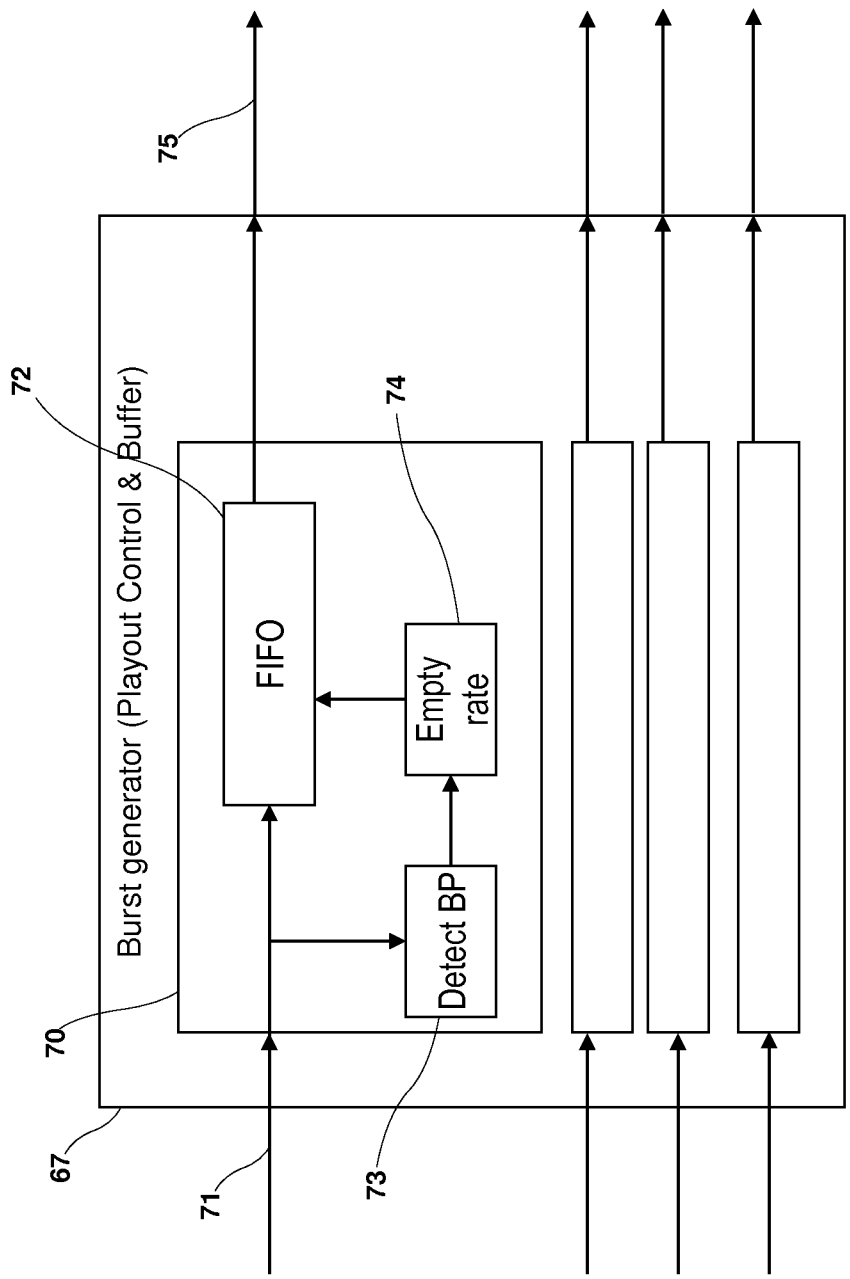
FIG. 9 shows part of the apparatus of FIG. 8 in more detail.

FIG. 9 shows further detail of the playout unit 67 of the apparatus of FIG. 8. The burst generator unit 67 comprises a parallel set of units 70. Each unit 70 has an input 71 for receiving a segmented stream 80A, 80B of one of the representations. Data is applied to a buffer 72. The buffer operates according to a First In First Out (FIFO) principle. Data is also applied to a detector 73 which detects signalling (e.g. BP signalling) within the data stream indicating the start and end of a segment. Detector 73 applies an output to a unit 74 which controls playout of data from the buffer 72. A segment of data is played out in one continuous block, which can be in the form of a sequence of TS or IP packets carrying TS packets. Unit 74 controls the playout rate, which is greater than the rate at which data was originally received. Data is output 75 in burst form, as explained above.

Figure 10:
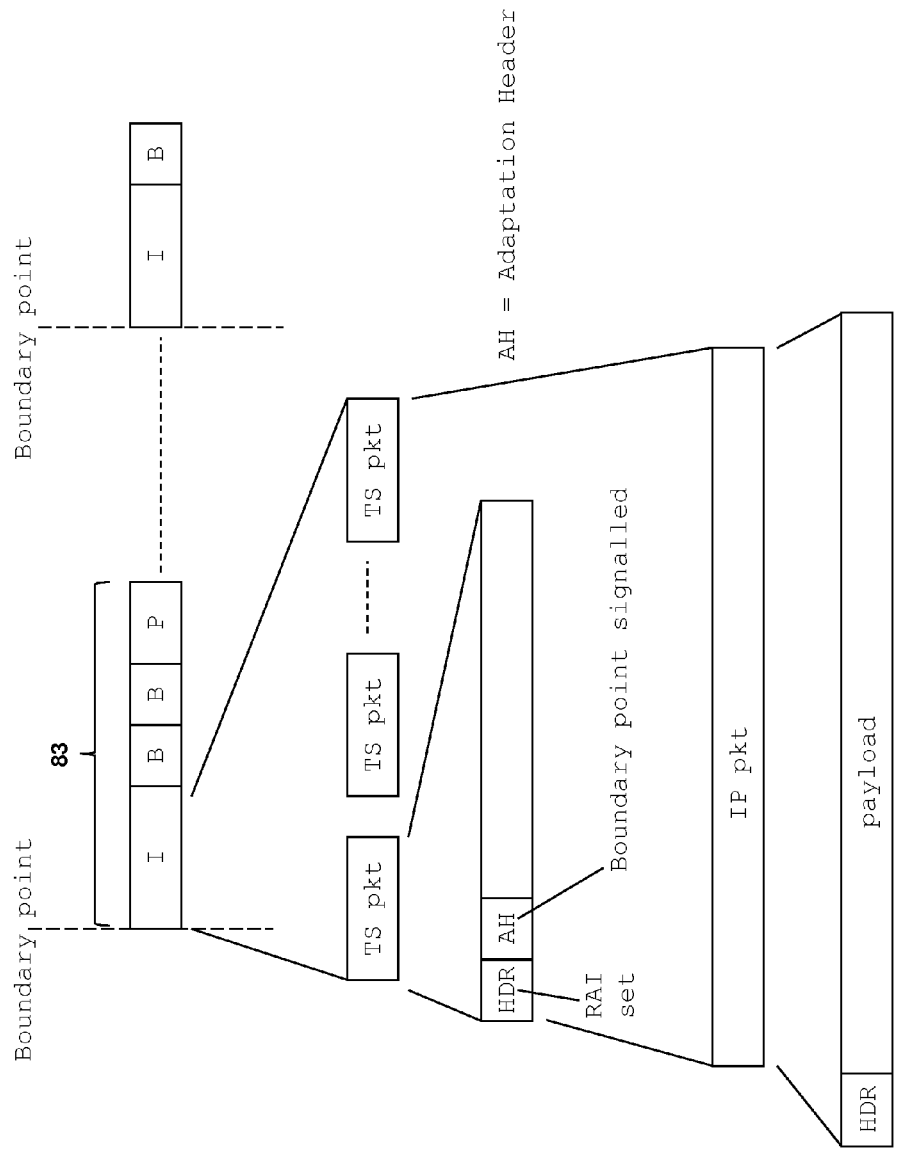
FIG. 10 shows packets used to carry media content data.

FIG. 10 shows an example format of packets used to carry media content data. Video data comprises data representing GOPs. A GOP comprises one or more of I frames, B frames and P frames. GOPs are carried in Transport Stream (TS) packets. Other possible formats include MPEG Dynamic Adaptive Streaming over HTTP (MPEG-DASH). A TS packet has a length of 188 bytes, of which 4 (or more) bytes are header bytes. A header of a TS packet can include signalling which indicates a Boundary Point. The BP can be signalled within the adaptation header (AH) of a TS packet. For an IP-based distribution network, TS packets are carried within the payloads of IP packets. Typically, 7 TS packets are aggregated into one IP packet. Typically, a segment will comprise multiple IP packets. IP packets may be spaced by a short inter-packet gap, which is considerably shorter than the window period. Segments may start with one or more TS packets before the first TS packet carrying (video) content data. One example of this is where encryption is used. The TS packet immediately before the first packet carrying video content contains data needed for provisioning the correct decryption key.

Figure 11:
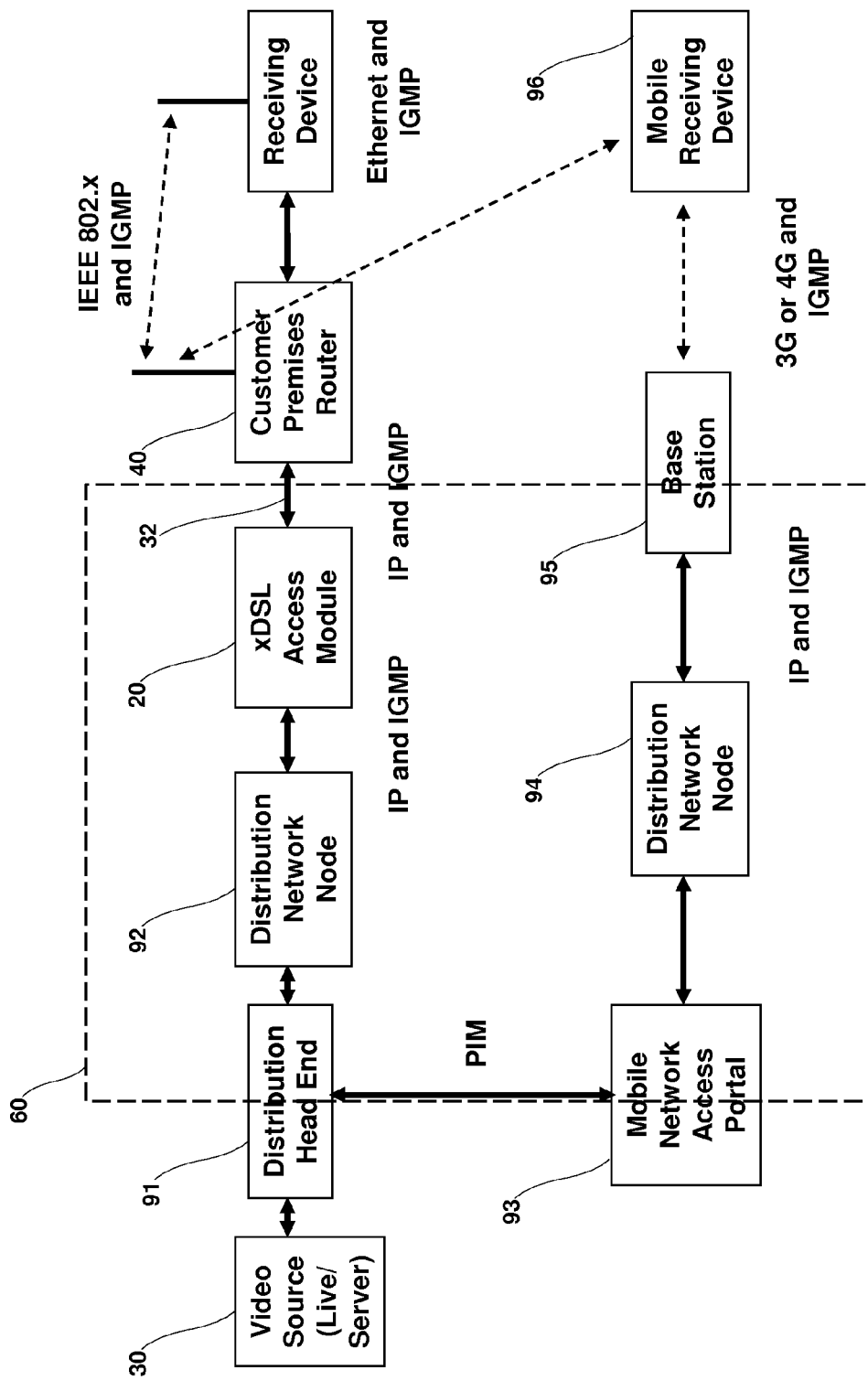
FIG. 11 shows a media content distribution network in more detail.

FIG. 11 shows distribution networks 60 that may be used to multicast media content data, and protocols used to carry the data and control data flows. The upper part of FIG. 11 represents a distribution network for IPTV services using xDSL to subscriber premises. A distribution head end 91 receives inputs 30 from content (e.g. video) sources, which can be live or recorded sources. The distribution network between the head end 91 and a DSL access module comprises distribution nodes 92, which include IP routers. The subscriber loop 32 to a subscriber premises is terminated, at the subscriber side, by a customer premises router, which can also be called a Residential Gateway (RG). Data is carried over the distribution network using IP. The Internet Group Management Protocol (IGMP) is a communications protocol used on the IP distribution network to establish multicast group memberships. Protocols such as IGMP are used to support the communication between upstream routers/servers and support the Leave and Join actions described above. Protocol-Independent Multicast (PIM) is another protocol used within the distribution network. Within the customer premises, content can be distributed by wired network protocols (e.g. Ethernet) or wireless network protocols (e.g. IEEE 802.x). PIM is used between routers, whereas IGMP is layer 2 and is used by switches. The protocols register a destination's interest in receiving a multicast, either for itself, or to be forwarded to one or more next destinations. When there is a leave, the traffic stops if there is nothing else at that destination that is joined. The fast leave operation terminates that flow immediately, whereas without fast leave, a switch will respond to a leave command sending out a request to see if any destination is still interested, keeping the traffic flowing until a timeout occurs. The fast leave operation is used in embodiments of the invention to switch between multicast representations.

The lower part of FIG. 11 represents a wireless distribution network, and comprises a Mobile Network Access Portal 93, Distribution Network Nodes 94 and wireless Base Stations 95. There is a wireless delivery channel between a base station 95 and a receiving device 96, which can use a 3G or 4G wireless protocol. As before, the IGMP can be used to establish multicast group memberships, and Protocol-Independent Multicast (PIM) can be used within the distribution network. The mobile receiving device 96 can share content with other devices using a wired or wireless connection. In the wireless system, base station 95 can perform the join multicast/leave multicast functionality (equivalent to that performed at the customer premises router 40) to share the limited resource of the overall wireless network capacity of the cell between multiple mobile receiving devices 96. Alternatively, a mobile receiving device 96 can perform the join multicast/leave multicast functionality, to share the limited resource of the wireless connection between device 96 and the base station 95 between multiple services required by the device 96.

Figure 12:
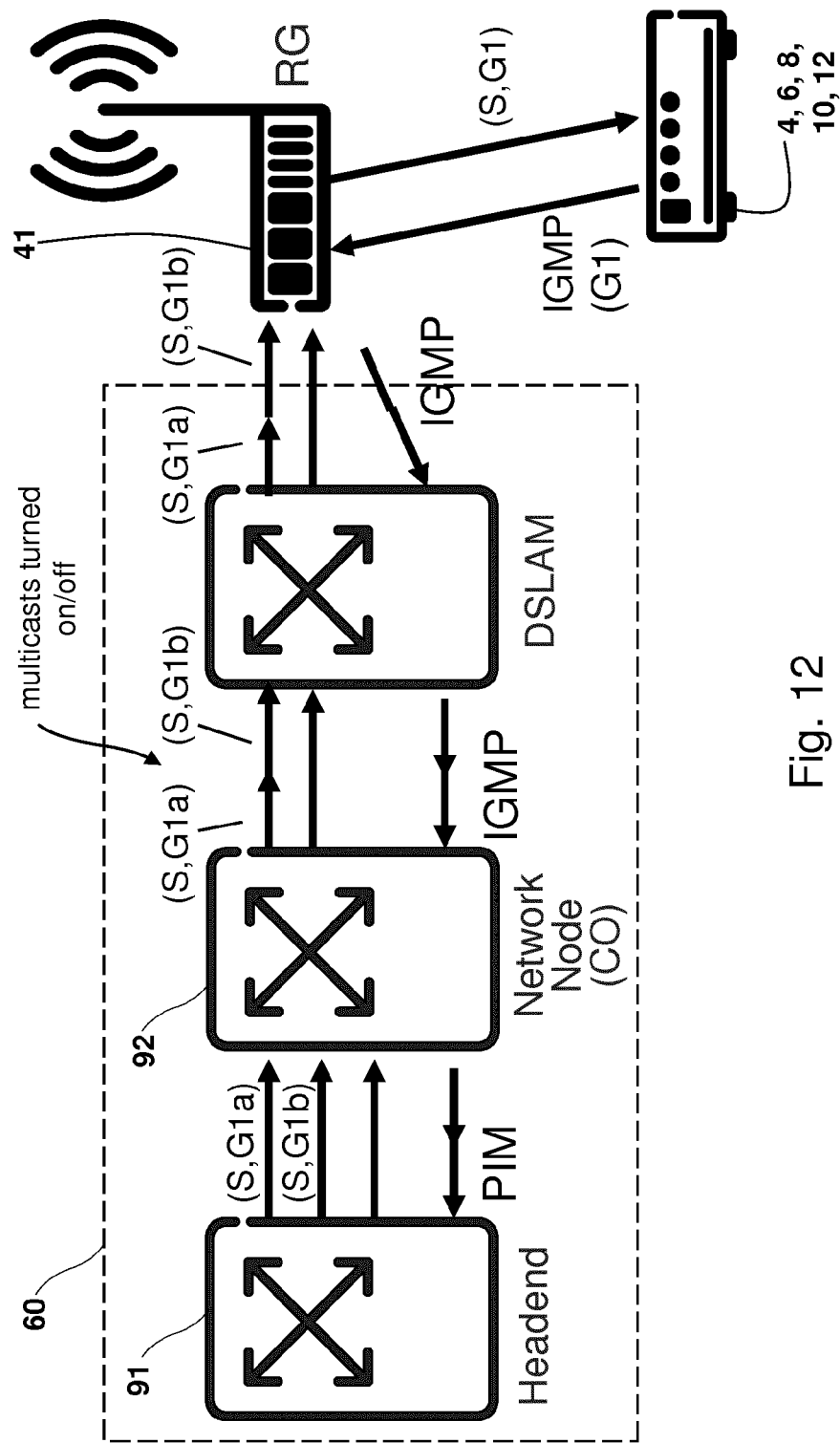
FIG. 12 shows transmission of multicasts to a subscriber apparatus.

FIG. 12 shows transmission of multicasts to a subscriber apparatus 41. Nodes within the distribution network can comprise a headend, a network node (such as a Central Office, and a multi-cast capable DSLAM. The (S,G) notation denotes S=Source Address, G=Multicast Destination Address. G1*a*, G1*b* are multicasts carrying different representations of one particular media content service. The multicasts are shown being sent in parallel from the headend 91 to node 92, because the multicasts are received by subscriber apparatus 41 at multiple premises within the network, but the multicasts are sent one at a time from the node 92 to the subscriber apparatus (RG) 41 based on the RG first requesting one of the representations (S, G1*a*) and then changing to the other of the representations (S, G1*b*) for a bit rate adjustment on that service. The RG 41 can concatenate the incoming multicasts, which may switch between representations, and form a single continuous multicast output to a conventional receiver 4, 6, 8, 10, 12. As explained above, the functionality of switching between multicast streams may be performed by a device 4, 6, 8, 10, 12 connected downstream of the RG, and that device would perform the concatenation.

Figure 13:
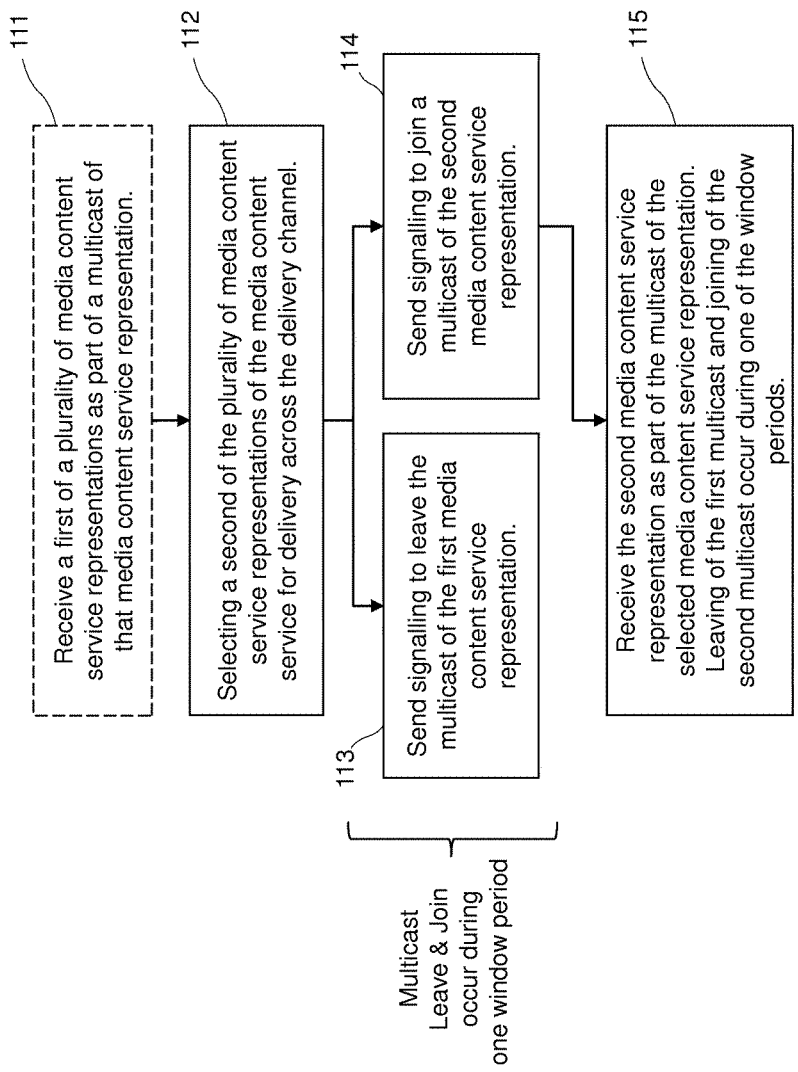
FIG. 13 shows a method of receiving media content data which can be performed at a subscriber apparatus.

FIG. 13 shows a method of receiving media content data which can be performed at a subscriber apparatus. Step 111 comprises receiving a first of a plurality of the media content service representations of the media content service across the delivery channel as part of a multicast of the first media content service representation. Step 112 comprises selecting a second of the media content service representations of the media content service for delivery across the delivery channel. Steps 113 and 114 can be performed in any order. Step 113 comprises sending signalling to leave the multicast of the first media content service representation. Step 114 comprises sending signalling to join a multicast of the second media content service representation. Step 115 comprises receiving the second media content service representation as part of the multicast of the selected media content service representation. The window period between successive bursts has a duration which is sufficient to allow a terminal to join the multicast, and the leaving and joining of the respective multicasts occurs during the window period.

Operating in the manner described above has an advantage in that only conventional networking equipment is needed in the core network of the operator's distribution network (downstream of the modified head end). Another advantage is that the network capacity is more efficiently used because when more than one subscriber is watching the same content (at the same rate) then the multicasts can be used by both, thereby reducing the core network bandwidth needed.

Another aspect of subscriber apparatus is that it can perform an arbitration function that repeatedly assesses the requested services into the home. This includes media content (e.g. video) services and other data services. The arbitration can select between a plurality of different bit rate representations of the same media content service and thereby determine an optimal selection of the services based on criteria such as overall capacity of the delivery channel, service category, user preferences, operator policies, decode/display types and service current/next quality metrics. One quality metric is complexity of encoding content and the arbiter can be arranged to allocate a greater portion of the shared bandwidth of the delivery channel when the content is more complex and a higher data rate is required to encode the content. As demands dynamically change over a period of time, it is possible to select a higher or lower bit rate representation of each requested service to fulfil all of the requests.

The mechanism described above makes it possible to select between different bit rate representations of a content media service in a seamless manner. Each subscriber apparatus can dynamically select a different mix of service rates depending on local needs of the devices served by that subscriber apparatus.

Figure 14:
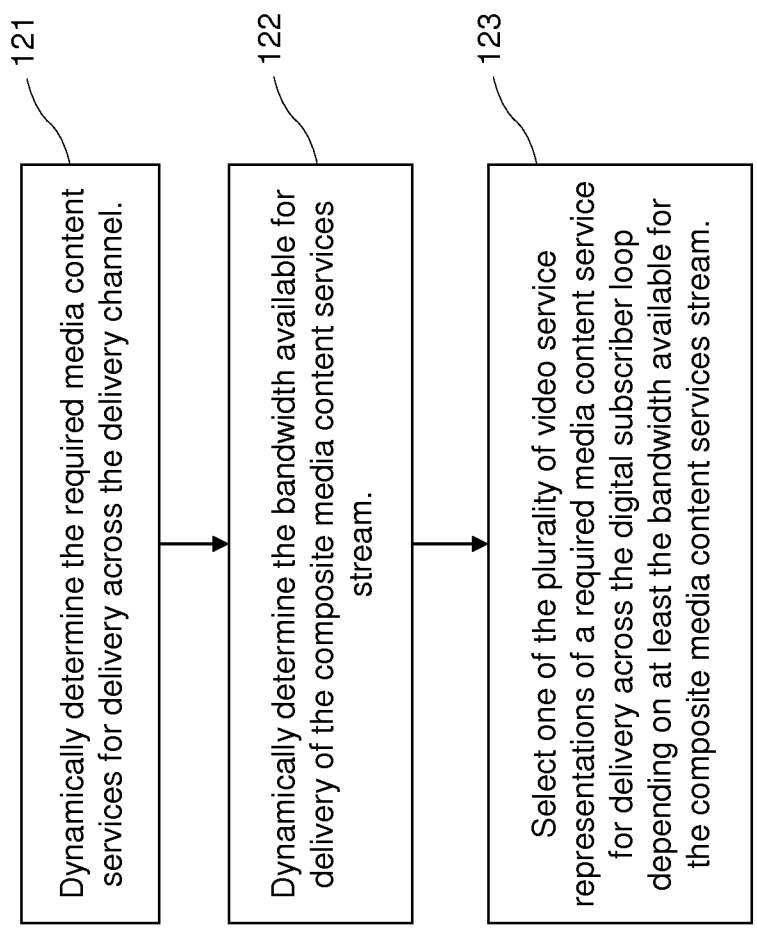
FIG. 14 shows a method of receiving media content data which can be performed at a subscriber apparatus.

FIG. 14 shows a method of determining media content services which can be performed at the subscriber apparatus. Step 121 comprises dynamically determining the required media content services for delivery across the delivery channel. Step 122 comprises dynamically determining the bandwidth available for delivery of the composite media content services stream. Step 123 comprises selecting one of the plurality of video service representations of a required media content service for delivery across the digital subscriber loop depending on at least the bandwidth available for the composite media content services stream.

The selecting at step 123 can depend on at least one of: a type of device associated with the media content service and a priority of the media content service. A higher priority information element is allocated to real-time media content services and a lower priority information element is allocated to recorded media content services. A priority information element associated with the media content service can depend on a categorisation of the media content service or a device which is to consume the content.

Figure 15:
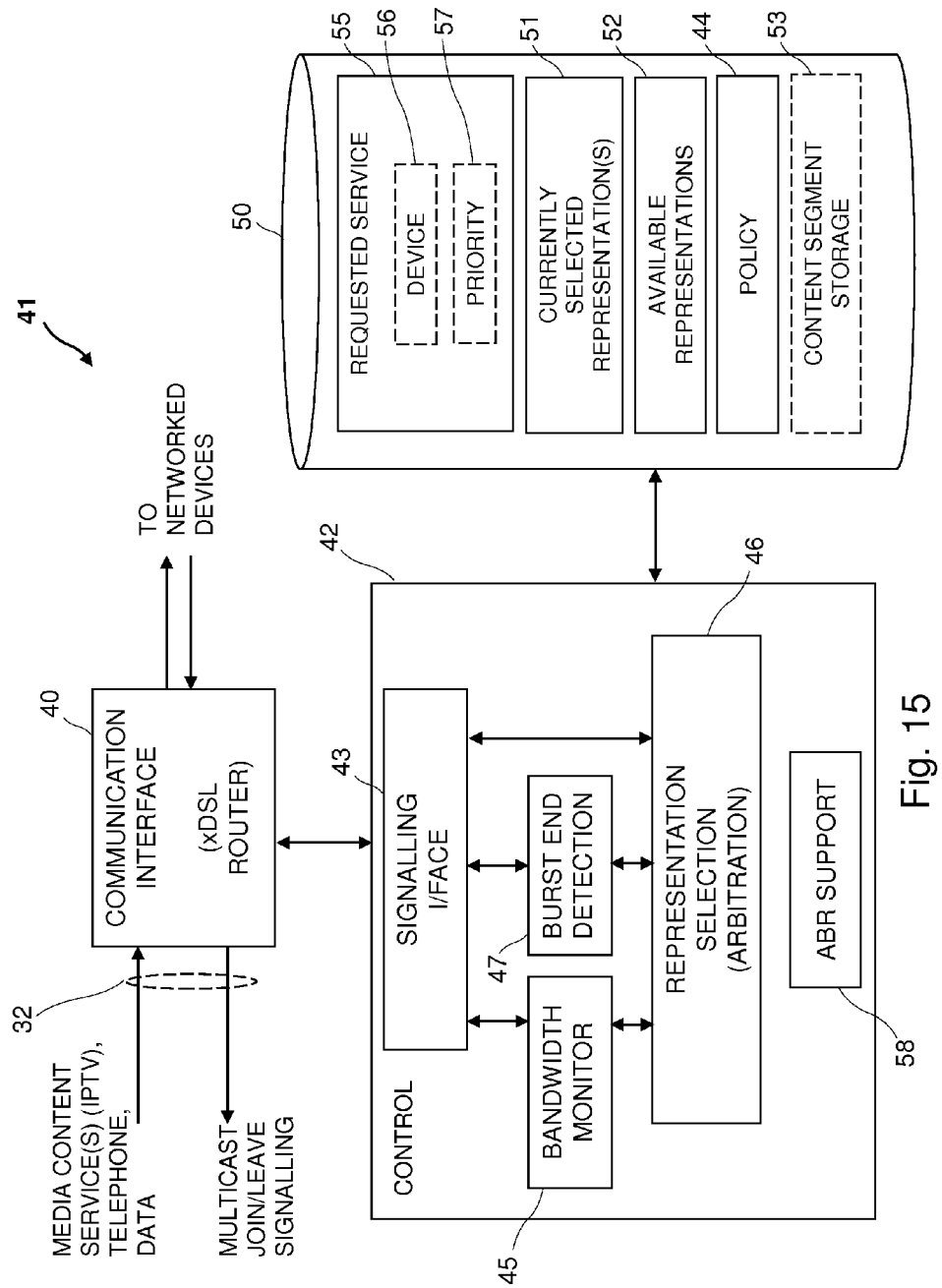
FIG. 15 shows apparatus in accordance with an embodiment of the invention.

FIG. 15 shows subscriber apparatus in accordance with an embodiment of the invention. An xDSL router 40 connects to a subscriber loop 32, which forms a two-way delivery channel to/from the premises. A controller 42 performs the method shown in FIG. 13 for selecting between representations of a media content service, and sending signalling to leave and join respective multicasts which deliver those representations. Controller 42 comprises a representation selection unit 46. Representation selection unit 46 receives inputs from a bandwidth monitor 45 and a burst end detector unit 47. Bandwidth monitor 45 monitors bandwidth of the delivery channel 32. Burst end detection unit 47 can detect in-band signalling, or out-of-band signalling, which indicates the end of a burst and a start of the window period during which a change of the representation can be made. A memory 50 is accessible by the representation selection unit 46. Memory 50 stores data which can include data 55 about each the requested services. Data 55 can include an indication 56 of the device which is to consume the content and an indication 57 of the priority of the requested service. The priority can be determined by using the stored policy 44. Memory 50 stores data 51 about the currently selected representation per media content service. Memory 50 stores data 52 about available representations per service (e.g. data indicating that representations are available for service X at bit rates of 2, 5, and 7 Mbit/s). Memory 50 can store policy data 44 which is used by the representation selection unit 46 to select between representations. As an example, the representation selection unit 46 may arbitrate between demands of: (i) a children's TV programme which is to be viewed on a small screen display device in a child's bedroom; (ii) a major sports event which is to be viewed on the household's main, large screen, display device. The representation selection unit 46 may also arbitrate between demands of other communications services, such as internet traffic. The policy that informs the choice can be partially defined centrally (e.g. sports programmes should be prioritised over kids programmes) and partially locally (e.g. definitions of the relative priorities of display devices at the premises, such as the main display having a higher priority than the display in the child's bedroom.)

Subscriber apparatus 41 can store data 53 which is received for at least one of received media content services, and can send information about the availability of the stored data to devices served by the apparatus 41. The marking of segments of content has already been performed in the distribution network, such as by the head end. Adaptive Bit Rate (ABR) clients retrieve a sequence of files corresponding to segments of content. The data of a received burst that is received according to an embodiment of the invention, corresponds to a segment that can be consumed by an Adaptive Bit Rate client. Subscriber apparatus 41 can make the segment available for retrieval by a client by a file fetch mechanism rather than the push mechanism used in the multicast delivery. Support for this type of operation is provided by an ABR support unit 58 which can form part of the subscriber apparatus 41 or some device downstream of the subscriber apparatus, such as a set-top box (STB). ABR support unit 58 converts each segment of received content data into an ABR segment that can be retrieved by an ABR device. Unit 58 then acts as a proxy and serves those files to the ABR client. In this scenario, only one rate would ever be visible to the ABR client, which is the rate from the multicast that the representation selection unit 46 has selected to receive. Unit 58 can support conversion into HTTP Live Streaming (HLS) or Dynamic Adaptive Streaming over HTTP (DASH) formats.

Figure 16:
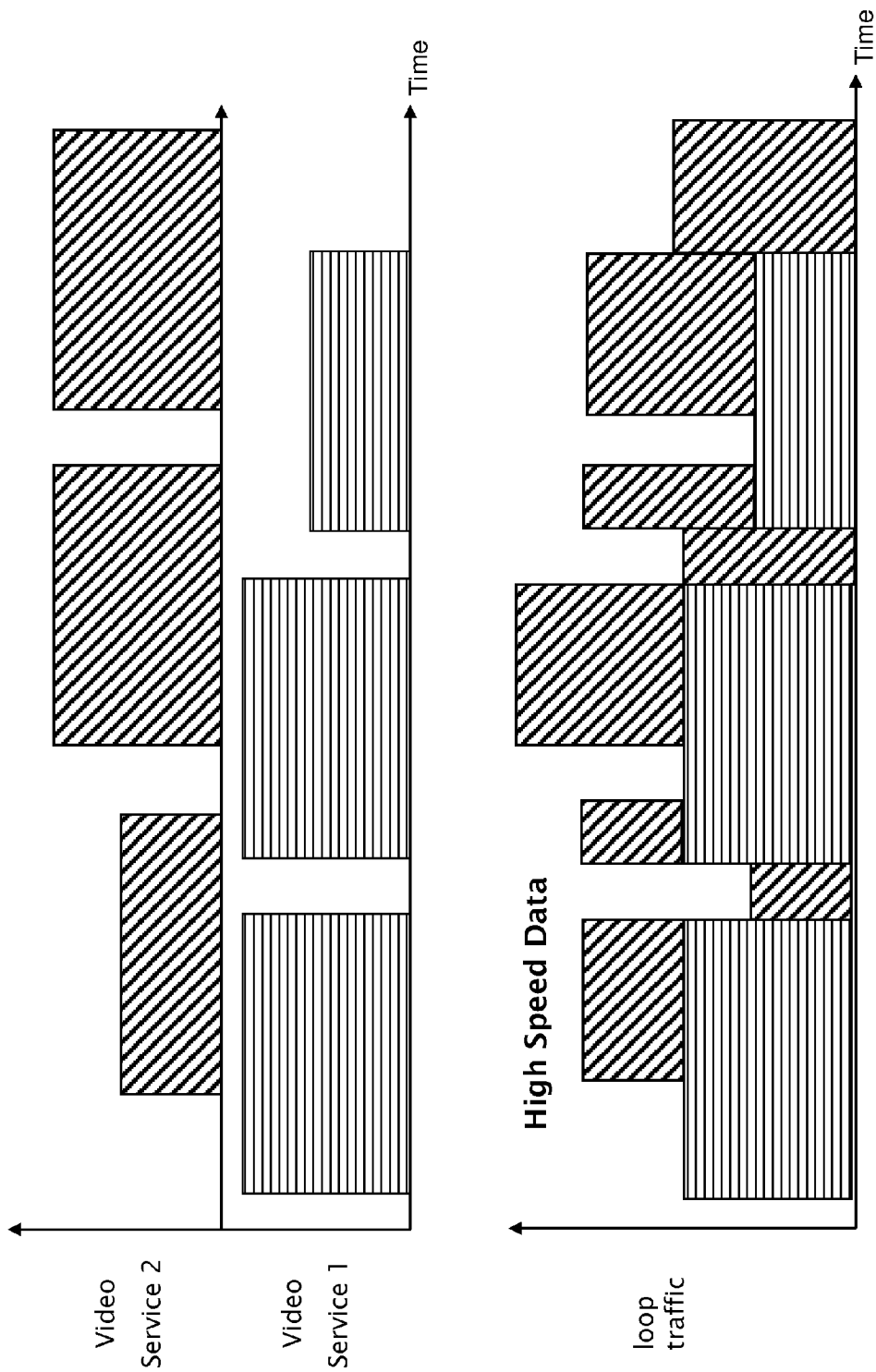
FIGS. 16 and 17 show utilisation of a delivery channel over a period of time in accordance with an embodiment of the invention

FIG. 16 shows bandwidth utilisation of a delivery channel, such as a subscriber loop 32 to a premises, over a period of time. Two video services are shown. Over the period of time shown, video service 1 starts at a high bit rate and then switches to a lower bit rate. Video service 2 starts at a low bit rate and then switches to a higher bit rate. At any point in time, the overall bandwidth consumed is the sum of video service 1+video service 2. Any spare capacity is available for high-speed data or other communication services.

Figure 17:
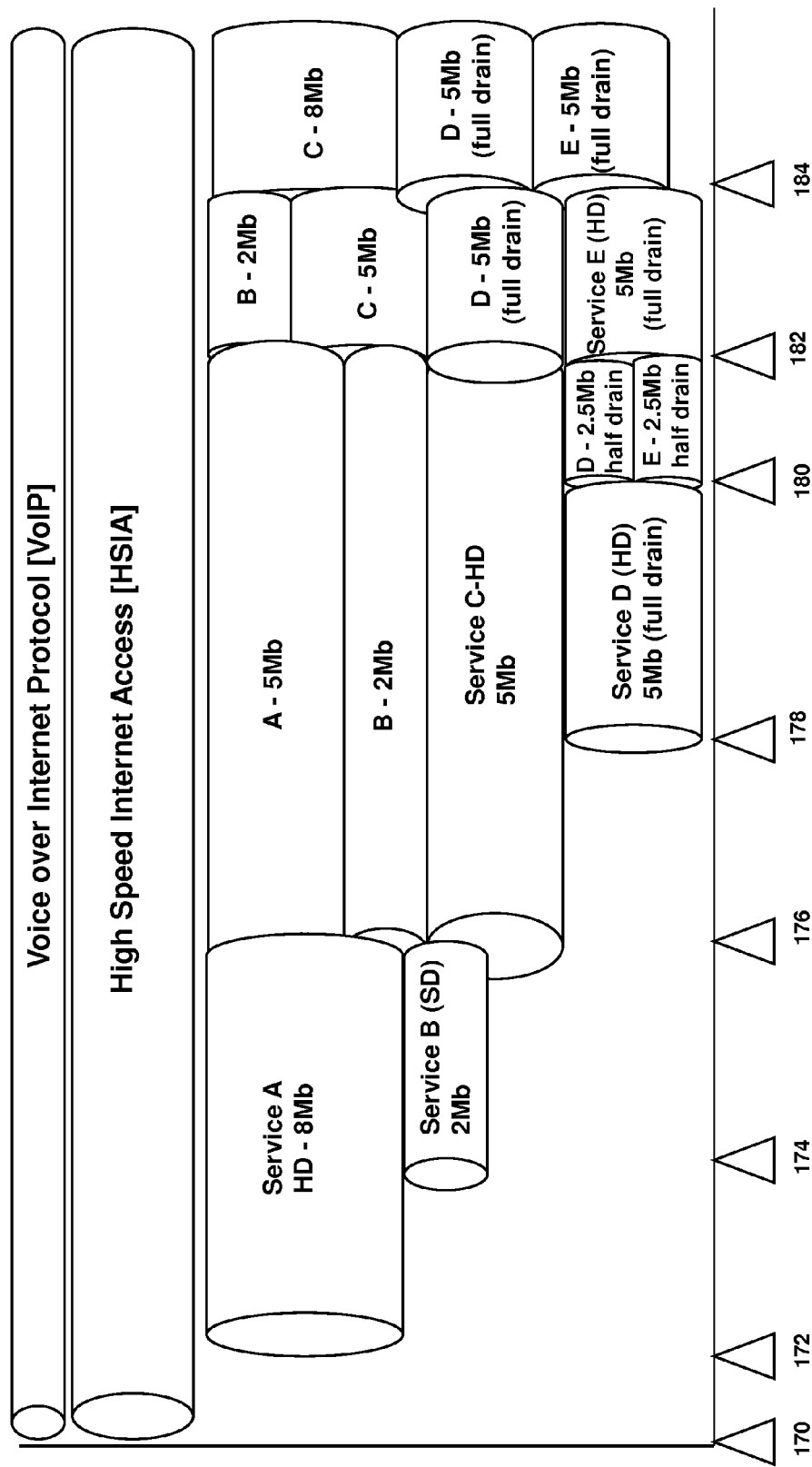

FIG. 17 shows a more detailed example of allocation of loop capacity over a period of time in response to changes in services demanded in an exemplary illustration. The horizontal axis in FIG. 17 shows time, while the vertical axis in FIG. 17 indicates video service representations and their bit rates.

The session begins at point 170 with only Voice over Internet Protocol (VoIP) and High Speed Internet Access services in place. The Voice over Internet Protocol (VoIP) and High Speed Internet Access services are permanently available for use on demand and are allocated fixed capacity. At this time there are no video services present.

At point 172 a first video service, Service A, is requested by a member of the subscriber's household and consists, in this example, of a high definition television (HDTV) version of that service initially set to be delivered at 8 Mbps (Mbit per second). It is to be displayed in real time on the main household large screen display device and may be, for example, a live news channel.

This progresses for a short time and then at point 174 another member of the household, possibly located elsewhere, selects Service B which may be, for example, an educational channel and this is provided to a computer terminal at standard definition and initially delivered at 2 Mbps. These services do not cause capacity conflicts and so are able to be delivered simultaneously. The appropriate segment capacity level from those available so that the service qualities requested can be delivered.

At point 176, some time later, the two existing services are joined by a third service, Service C, requested by yet another household member and which may be for example in the exemplary embodiment a sports channel requested in high definition (HD). The sum of the service requirements of the three services A, B and C now exceeds the subscriber loop capacity, and so some adaptation is necessary according to the invention.

In the exemplary embodiment this adaptation results in the selection of video services representations for the high definition (HD) services A and C having a bit rate of 5 Mbps. The bit rate of the video service representation selected for Service B remains unchanged at 2 Mbps.

This situation remains in place for some time further until at point 178 a pre-set recording function is initiated by the domestic Digital Video Recorder (DVR) device. The content required is service D in high definition (HD), which is to be delivered in real time at 5 Mbps. This set of capacities is within the loop capacity, and as a result the high definition (HD) video services representation is selected.

Shortly after this at point 180 another pre-set recording request for service E is initiated and this demand requires a change in the bit rates of the existing services. This is managed using the resources of the invention so that services A, B and C being live TV services do not change bit rates and the new service is accommodated by selecting new video services representations for the DVR services so as to reduce the bit rates for the two to 2.5 Mbps which means, if the quality criteria are retained, that the content will be delivered at half speed taking twice as long to complete. This is a reasonable adjustment that balances the live and DVR service requirements.

This combination of services continues for a while until at point 182 service A is terminated making 5 Mbps available. The system chooses to leave real time services unchanged and to allocate this capacity to the DVR channels restoring real time speed delivery at 5 Mbps each. Thus a video services representation with increased bit rate is selected.

It is possible for quality criteria and capacities to be such that a number of DVR events, which may be set up by different household members so that no one is fully aware of the DVR schedule, cannot be satisfied as well as the current real time services being consumed. This may require the system to intervene and issue on screen messages to an appropriate channels warning of the likelihood of the loss of a digital video recording (DVR) event unless some quality criteria are changed so that for example the standard definition (SD) video services representation is selected instead of the High Definition video services representation or a live service is terminated.

Later still, at point 184, service B terminates making available a further 2 Mbps. This additionally available bandwidth is used to enhance service C by selecting a video services representation for service C having a higher bit rate.

Embodiments of the invention continue is this fashion seamlessly adjusting capacity allocations so that demand is managed intelligently and always within the loop capacity and always maintaining service quality criteria.

FIG. 18 shows an exemplary processing apparatus 200 which may be implemented as any form of a computing and/or electronic device, and in which embodiments of the system and methods described above may be implemented. Processing apparatus 200 can be provided at one of the distribution network nodes, or at a subscriber apparatus 41. Processing apparatus may implement the method shown in any of FIGS. 5, 13 and 14. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of distributing a streaming digital media content service across an electronic packet-based distribution network, the method comprising:

receiving or generating, at a node in the electronic packet-based distribution network, a plurality of media content service representations for the streaming digital media content service, each of the media content representations having a different bit rate;

dividing each of the media content service representations into segments, wherein the segments of the plurality of media content service representations are aligned in time such that segment boundaries of each of the plurality of media content service representations are at the same time as a corresponding segment boundary in each of the plurality of media content service representations, wherein a segment comprises a set of frames of video content and a corresponding segment in each of the plurality of media content service representations corresponds to the same frames of video content; and transmitting the segments of each of the plurality of media content service representations as a sequence of bursts, wherein the bursts of the plurality of media content service representations are aligned in time such that starting transmission times for each burst of the sequence of bursts of each of the plurality of media content service representations are at the same time as corresponding bursts in each of the plurality of media content service representations, and wherein there is a window period between successive bursts during which media content is not transmitted, the window period comprising a duration sufficient for a multicast receiver to leave one media content representation and join a different media content representation at a different bit rate, wherein each of the media content service representations is transmitted as a multicast, and wherein each of the received or generated media content service representations has a respective bit rate and the transmitting comprises transmitting each of the segments at a higher bit rate to create the window period between successive bursts during which media content is not transmitted.

2. A method according to claim 1 wherein the dividing comprises inserting data which indicates a boundary of a segment and the step of transmitting each of the segments uses the inserted data to determine a boundary of a segment.

3. A method according to claim 2 further comprising transmitting an information element which indicates at least one of:
   an end of a burst;
   an advance notice of an end of a burst.

4. A method according to claim 3 wherein the information element is carried within each of the bursts.

5. A method according to claim 3 wherein each of the media content service representations is transmitted as a first multicast with a multicast destination IP address, and the method comprises transmitting a second multicast which carries the information element, wherein the second multicast has the same destination IP address as the first multicast.

6. A method according to claim 1 further comprising adapting the media content data into packets for transport over the electronic packet-based distribution network, and the step of transmitting each of the segments as a burst operates on the packets.

7. A method according to claim 1 wherein the generating comprises receiving a stream of media content data and transcoding the stream to form the plurality of representations of the media content data at the plurality of different bit rates.

8. A method according to claim 1 further comprising transmitting information about which media content service representations are available for selection.

9. A computer program product comprising a non-transient machine-readable medium carrying instructions which, when executed by a processor, cause the processor to perform the method of claim 1.

10. A method of receiving a streaming digital media content service across an electronic packet-based delivery channel, the streaming digital media content service being available in a plurality of representations each having a different bit rate, wherein each of the plurality of media content representations are transmitted as a sequence of bursts, with the bursts aligned in time such that starting transmission times for each burst of the sequence of bursts of each of the plurality of media content service representations are at the same time as a corresponding segment boundary in each of the plurality of media content service representations, wherein a segment comprises a set of frames of video content and a corresponding segment in each of the plurality of media content service representations corresponds to the same frames of video content, and wherein there is a window period between successive bursts during which media content is not transmitted, the window period comprising a duration sufficient for a multicast receiver to leave one media content representation and join a different media content representation at a different bit rate, the method comprising:
   receiving, at a subscriber apparatus, a first of the media content service representations of the media content service across the electronic packet-based delivery channel as part of a multicast of the first media content service representation;
   selecting a second of the media content service representations of the media content service for delivery across the electronic packet-based delivery channel;
   sending a request to leave the multicast of the first media content service representation;
   sending a request to join a multicast of the second media content service representation; and,
   receiving the second media content service representation as part of the multicast of the selected media content service representation, wherein both the leaving and joining of the respective multicasts occurs during the same one of the window periods between successive bursts during which media content is not transmitted.

11. A method according to claim 10 further comprising receiving an information element which indicates at least one of:
   an end of a burst;
   an advance notice of an end of a burst and using the information element to determine when the sending a request to leave the multicast of the first media content service representation and the sending a request to join a multicast of the second media content service representation can occur.

12. A method according to claim 10 further comprising receiving information about which media content service representations are available for selection.

13. A method according to claim 10 wherein the step of sending a request to join a multicast occurs before the step of sending a request to leave a multicast.

14. A method according to claim 10 for receiving a composite media content services stream, comprising one or more media content services, the method further comprising:

dynamically determining the required media content services for delivery across the electronic packet-based delivery channel;
dynamically determining the bandwidth available for delivery of the composite media content services stream; and
selecting one of the plurality of media content service representations of a required media content service for delivery across the electronic packet-based delivery channel depending on at least the bandwidth available for the composite media content services stream.

15. A method according to claim 14 wherein the selecting depends on at least one of:
a type of device associated with the streaming digital media content service and a priority of the streaming digital media content service.

16. A method according to claim 15 wherein a higher priority information element is allocated to real-time media content services and a lower priority information element is allocated to recorded media content services.

17. A method according to claim 15 wherein a value of a priority information element associated with the streaming digital media content service depends on at least one of:
a categorisation of the streaming digital media content service;
a device which is to consume the streaming digital media content service.

18. A method according to claim 10 further comprising:
storing data received in bursts of the received streaming digital media content service;
sending information about the availability of the stored data to adaptive bit rate devices served by the apparatus.

19. A method according to claim 10 performed at a subscriber apparatus.

20. A method according to claim 10 wherein each burst comprises a plurality of Internet Protocol packets.

21. A method according to claim 10 wherein the streaming digital media content service is a video service.

22. A method according to claim 21 wherein at least two of the plurality of media content service representations for the video service have a different video resolution.

23. Apparatus for distributing a streaming digital media content service across an electronic packet-based distribution network, the apparatus comprising:
an interface for receiving a streaming digital media content service;
a segmenting processor arranged to generate a plurality of segmented media content service representations for the streaming digital media content service, each of the media content representations having a different bit rate and divided into segments, wherein the segments of the plurality of media content service representations are aligned in time such that segment boundaries of each of the plurality of media content service representations are at the same time as a corresponding segment boundary in each of the plurality of media content service representations, wherein a segment comprises a set of frames of video content and a corresponding segment in each of the plurality of media content service representations corresponds to the same frames of video content;
a transmitter arranged to transmit the segments of each of the plurality of media content service representations as a sequence of bursts, wherein the bursts of the plurality of media content service representations are aligned in time such that starting transmission times for each burst of the sequence of bursts of each of the plurality of media content service representations are at the same time as corresponding bursts in each of the plurality of media content service representations, and wherein there is a window period between successive bursts during which media content is not transmitted, the window period comprising a duration sufficient for a multicast receiver to leave one media content representation and join a different media content representation at a different bit rate,
wherein each of the media content service representations is transmitted as a multicast, and wherein each of the received or generated media content service representations has a respective bit rate and the transmitter is arranged to transmit each of the segments at a higher bit rate to create the window period between successive bursts during which media content is not transmitted.

24. Apparatus for receiving a streaming digital media content service across an electronic packet-based delivery channel, the streaming digital media content service being available in a plurality of representations each having a different bit rate, wherein each of the plurality of media content representations are transmitted as a sequence of bursts, with the bursts aligned in time such that starting transmission times for each burst of the sequence of bursts of each of the plurality of media content service representations are at the same time as a corresponding segment boundary in each of the plurality of media content service representation, wherein a segment comprises a set of frames of video content and a corresponding segment in each of the plurality of media content service representations corresponds to the same frames of video content, and wherein there is a window period between successive bursts during which media content is not transmitted, the window period comprising a duration sufficient for a multicast receiver to leave one media content representation and join a different media content representation at a different bit rate, the apparatus comprising:
a communication interface for receiving a first of the media content service representations of the streaming digital media content service across the electronic packet-based delivery channel as part of a multicast of the first media content service representation;
a controller coupled to the communication interface which is arranged to:
select a second of the media content service representations of the streaming digital media content service for delivery across the electronic packet-based delivery channel;
send a request to leave the multicast of the first media content service representation;
send a request to join a multicast of the second media content service representation; and,
receive the second media content service representation as part of the multicast of the selected media content service representation,
wherein both the leaving and joining of the respective multicasts occurs during the same one of the window periods between successive bursts during which media content is not transmitted.

* * * * *